United States Patent
Zhu et al.

(10) Patent No.: US 12,069,689 B2
(45) Date of Patent: Aug. 20, 2024

(54) SIGNALING FOR MULTICAST BROADCAST SERVICE SINGLE FREQUENCY NETWORK COMMUNICATIONS

(71) Applicant: QUALCOMM Incorporated, San Diego, CA (US)

(72) Inventors: Xipeng Zhu, San Diego, CA (US); Prasad Reddy Kadiri, San Diego, CA (US); Umesh Phuyal, San Diego, CA (US); Le Liu, San Jose, CA (US); Alberto Rico Alvarino, San Diego, CA (US); Kazuki Takeda, Tokyo (JP); Masato Kitazoe, Tokyo (JP); Sitaramanjaneyulu Kanamarlapudi, San Diego, CA (US); Sony Akkarakaran, Poway, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/643,273

(22) Filed: Dec. 8, 2021

(65) Prior Publication Data
US 2023/0180247 A1 Jun. 8, 2023

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0092* (2013.01); *H04W 4/06* (2013.01); *H04W 72/30* (2023.01)

(58) Field of Classification Search
CPC ....... H04W 72/23; H04W 72/30; H04W 4/06; H04L 5/0092
(Continued)

(56) References Cited

U.S. PATENT DOCUMENTS

| 11,641,644 B2 * | 5/2023 | Badic | H04W 40/24 |
| | | | 370/329 |
| 11,689,338 B2 * | 6/2023 | Faxér | H04W 24/10 |
| | | | 370/329 |

(Continued)

FOREIGN PATENT DOCUMENTS

| CN | 108307507 A * | 7/2018 | ........... H04L 1/0047 |
| CN | 116134844 A * | 5/2023 | .............. H04W 4/08 |

(Continued)

OTHER PUBLICATIONS

International Search Report and Written Opinion—PCT/US2022/078518—ISA/EPO—Feb. 8, 2023.

*Primary Examiner* — Melvin H Pollack
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive a configuration, for a multicast broadcast service (MBS) single frequency network (SFN) area, indicating configuration information for one or more multicast traffic channels. The UE may receive, in accordance with the configuration, a physical downlink control channel (PDCCH) communication scheduling an MBS SFN data communication associated with a multicast traffic channel, of the one or more multicast traffic channels. The UE may receive the MBS SFN data communication via a physical downlink shared channel (PDSCH) that is associated with both SFN communications and unicast communications or that is associated with only MBS SFN communications. Numerous other aspects are provided.

30 Claims, 16 Drawing Sheets

(51) Int. Cl.
*H04W 4/06* (2009.01)
*H04W 72/30* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 11,695,459 | B2 * | 7/2023 | Khoryaev | H04B 7/0695 375/267 |
| 11,711,787 | B2 * | 7/2023 | Cirik | H04W 72/1268 370/329 |
| 11,757,543 | B2 * | 9/2023 | Chervyakov | H04B 17/345 370/252 |
| 11,844,094 | B2 * | 12/2023 | Yeo | H04W 48/16 |
| 11,856,576 | B2 * | 12/2023 | Cha | H04W 24/08 |
| 2014/0086173 | A1 | 3/2014 | Sadeghi et al. | |
| 2018/0049060 | A1 * | 2/2018 | Fujishiro | H04W 72/30 |
| 2023/0051095 | A1 * | 2/2023 | Wei | H04W 48/14 |
| 2023/0155741 | A1 * | 5/2023 | Jang | H04L 1/1864 370/312 |
| 2023/0189395 | A1 * | 6/2023 | Baek | H04W 76/40 370/312 |
| 2023/0262423 | A1 * | 8/2023 | Fujishiro | H04W 76/40 370/329 |
| 2023/0276470 | A1 * | 8/2023 | Di Girolamo | H04W 4/06 370/312 |
| 2023/0284044 | A1 * | 9/2023 | Navratil | H04W 4/06 370/329 |
| 2023/0299890 | A1 * | 9/2023 | Baek | H04W 72/30 370/329 |
| 2023/0328762 | A1 * | 10/2023 | Chai | H04L 1/1812 370/329 |
| 2023/0353987 | A1 * | 11/2023 | Babaei | H04W 4/06 |
| 2023/0362959 | A1 * | 11/2023 | Latheef | H04L 5/0044 |
| 2023/0362960 | A1 * | 11/2023 | Adjakple | H04W 4/08 |
| 2023/0370893 | A1 * | 11/2023 | Stare | H04W 76/34 |
| 2023/0371046 | A1 * | 11/2023 | Babaei | H04W 72/121 |
| 2023/0380002 | A1 * | 11/2023 | Hong | H04W 76/40 |
| 2023/0388866 | A1 * | 11/2023 | Di Gorolamo | H04W 36/0085 |
| 2023/0388891 | A1 * | 11/2023 | Wu | H04W 36/362 |
| 2023/0389119 | A1 * | 11/2023 | Araujo | H04W 76/16 |
| 2023/0397232 | A1 * | 12/2023 | Baek | H04W 72/30 |
| 2023/0403537 | A1 * | 12/2023 | Chou | H04W 4/06 |

FOREIGN PATENT DOCUMENTS

| | | | | |
|---|---|---|---|---|
| CN | 116782134 A | * | 9/2023 | |
| WO | WO-2021049871 A1 | | 3/2021 | |
| WO | WO-2022065495 A1 | * | 3/2022 | ............. H04W 4/06 |
| WO | WO-2023074530 A1 | * | 5/2023 | |
| WO | WO-2023197173 A1 | * | 10/2023 | |

* cited by examiner

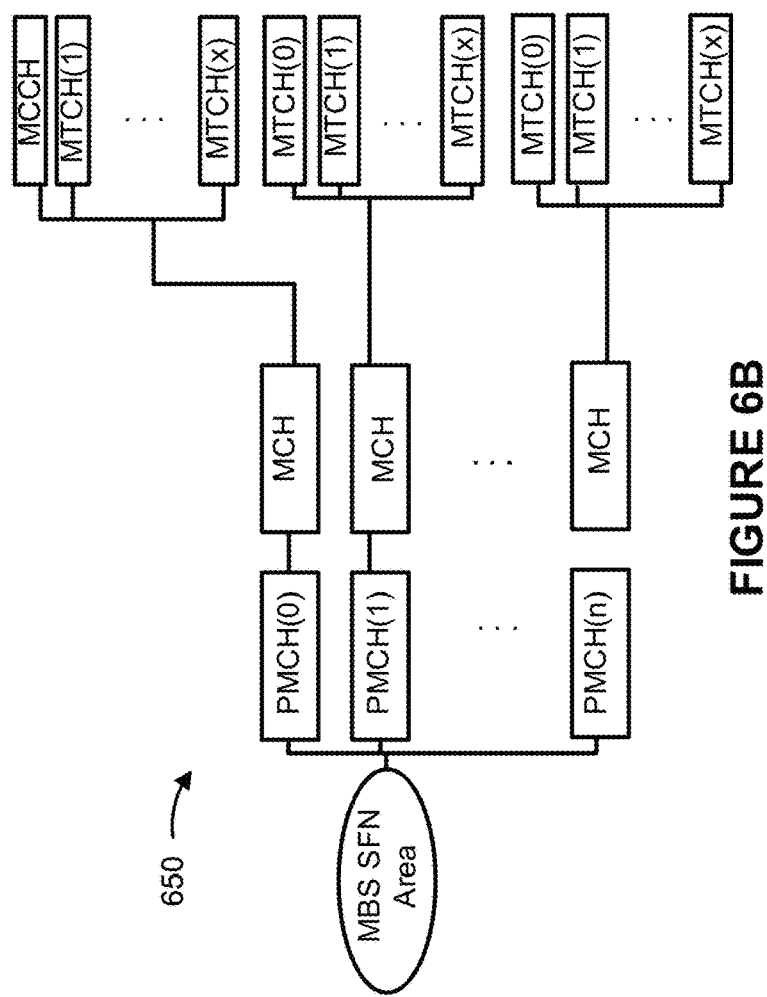
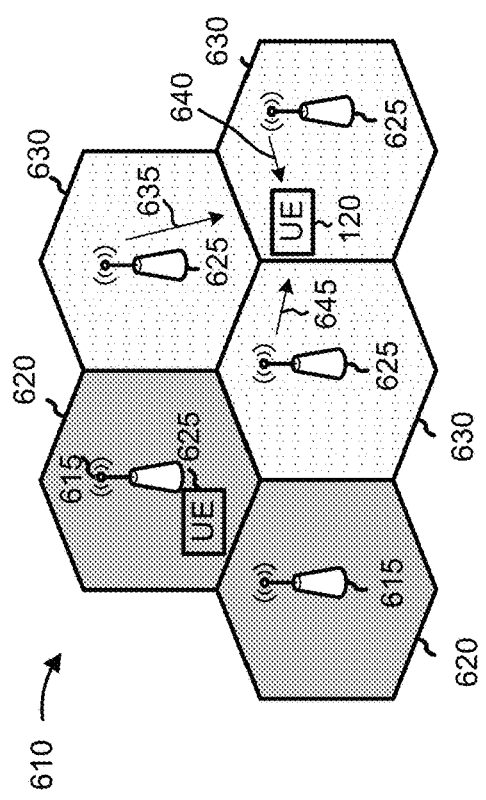
FIGURE 6A
FIGURE 6B

… (1)

SIGNALING FOR MULTICAST BROADCAST SERVICE SINGLE FREQUENCY NETWORK COMMUNICATIONS

FIELD OF THE DISCLOSURE

Aspects of the present disclosure generally relate to wireless communication and specifically, to techniques and apparatuses for signaling for multicast broadcast service (MBS) single frequency network (SFN) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A single frequency network (SFN) may improve gain by turning inter-cell interference into a useful signal that may assist a user equipment (UE) in receiving downlink data. For example, the SFN transmits the same downlink signal from multiple cells at the same time and using the same frequency resources. Although the signal is transmitted by different cells, a UE receiving the signal may receive the signal as a signal from a single cell, and the transmissions from other cells may improve the signal received by the UE. SFN transmission involves inter-cell coordination in order to transmit the signal at the same time and using the same frequency resources. In some cases, the signal that is transmitted in the SFN may include multicast broadcast service (MBS) data. In some examples, the multiple cells transmitting the MBS as an SFN may correspond to a same distributed unit (DU). Scenarios in which the multiple cells transmitting the MBS as an SFN may correspond to a same distributed unit may be referred to as an intra-DU SFN. The intra-DU SFN may provide a relatively small area SFN among cells connected to the same DU. A small area SFN may be associated with a small geographic area associated with the MBS SFN area. In order to support a larger geographic area for MBS SFN communications, an MBS SFN area may be associated with multiple DUs (for example, an inter-DU MBS SFN area) or multiple central units (CUs) (for example, an inter-CU MBS SFN area). For example, a wide area SFN may be associated with an intra-CU, inter-DU MBS SFN area (for example, associated with a single CU and multiple DUs) or an inter-CU, inter-DU MBS SFN area (for example, associated with multiple CUs and multiple DUs). To support the wide area SFN, coordination among multiple DUs or multiple CUs may be needed to facilitate transmitting an MBS signal, from multiple DUs or multiple cells, at the same time and using the same frequency resources. However, signaling and coordination among multiple CUs or multiple DUs to support a wide MBS SFN area is not defined. Therefore, a wireless network may be unable to support the wide MBS SFN area. Additionally or alternatively, the lack of signaling or coordination among multiple CUs or multiple DUs to support a wide MBS SFN area may result in degraded performance or reliability associated with MBS SFN communications in the wide MBS SFN area.

SUMMARY

Some aspects described herein relate to a user equipment (UE) for wireless communication. The UE may include at least one processor and at least one memory, communicatively coupled with the at least one processor, that stores processor-readable code. The processor-readable code, when executed by the at least one processor, may be configured to cause the UE to receive a configuration, for a multicast broadcast service (MBS) single frequency network (SFN) area, indicating configuration information for one or more multicast traffic channels. The processor-readable code, when executed by the at least one processor, may be configured to cause the UE to receive, in accordance with the configuration, a physical downlink control channel (PDCCH) communication scheduling an MBS SFN data communication associated with a multicast traffic channel, of the one or more multicast traffic channels. The processor-readable code, when executed by the at least one processor, may be configured to cause the UE to receive the MBS SFN data communication via a physical downlink shared channel (PDSCH) that is associated with both SFN communications and unicast communications or that is associated with only MBS SFN communications.

Some aspects described herein relate to a distributed unit (DU) for wireless communication. The distributed unit may include at least one processor and at least one memory, communicatively coupled with the at least one processor, that stores processor-readable code. The processor-readable code, when executed by the at least one processor, may be configured to cause the DU to receive, from a central unit (CU), a configuration for an MBS SFN area associated with the CU, the configuration indicating configuration information for one or more multicast channels. The processor-readable code, when executed by the at least one processor, may be configured to cause the DU to transmit, to one or more UEs in accordance with the configuration, a PDCCH communication scheduling an MBS SFN data communication that is associated with a multicast traffic channel. The processor-readable code, when executed by the at least one processor, may be configured to cause the DU to transmit, to the one or more UEs, the MBS SFN data communication via a PDSCH that is associated with both SFN communications and unicast communications or a PDSCH that is associated with only MBS SFN communications.

Some aspects described herein relate to a method of wireless communication performed by a UE. The method may include receiving a configuration, for an MBS SFN area, indicating configuration information for one or more multicast traffic channels. The method may include receiving, in accordance with the configuration, a PDCCH communication scheduling an MBS SFN data communication associated with a multicast traffic channel, of the one or more multicast traffic channels. The method may include receiving the MBS SFN data communication via a PDSCH that is associated with both SFN communications and unicast communications or that is associated with only MBS SFN communications.

Some aspects described herein relate to a method of wireless communication performed by a DU. The method may include receiving, from a CU, a configuration for an MBS SFN area associated with the CU, the configuration indicating configuration information for one or more multicast channels. The method may include transmitting, to one or more UEs in accordance with the configuration, a PDCCH communication scheduling an MBS SFN data communication that is associated with a multicast traffic channel. The method may include transmitting, to the one or more UEs, the MBS SFN data communication via a PDSCH that is associated with both SFN communications and unicast communications or a PDSCH that is associated with only MBS SFN communications.

Some aspects described herein relate to a CU for wireless communication. The CU may include at least one processor and at least one memory, communicatively coupled with the at least one processor, that stores processor-readable code. The processor-readable code, when executed by the at least one processor, may be configured to cause the CU to transmit, to one or more DUs, a configuration for an MBS SFN area associated with the CU, the configuration indicating a resource allocation for MBS SFN communications and a channel mapping for one or more multicast channels. The processor-readable code, when executed by the at least one processor, may be configured to cause the CU to transmit, to the one or more DUs, an MBS packet to be transmitted in accordance with the configuration.

Some aspects described herein relate to a method of wireless communication performed by a CU. The method may include transmitting, to one or more DUs, a configuration for an MBS SFN area associated with the CU, the configuration indicating a resource allocation for MBS SFN communications and a channel mapping for one or more multicast channels. The method may include transmitting, to the one or more DUs, an MBS packet to be transmitted in accordance with the configuration.

Some aspects described herein relate to a non-transitory computer-readable medium that stores a set of instructions for wireless communication by a UE. The set of instructions, when executed by one or more processors of the UE, may cause the UE to receive a configuration, for an MBS SFN area, indicating configuration information for one or more multicast traffic channels. The set of instructions, when executed by one or more processors of the UE, may cause the UE to receive, in accordance with the configuration, a PDCCH communication scheduling an MBS SFN data communication associated with a multicast traffic channel, of the one or more multicast traffic channels. The set of instructions, when executed by one or more processors of the UE, may cause the UE to receive the MBS SFN data communication via a PDSCH that is associated with both SFN communications and unicast communications or that is associated with only MBS SFN communications.

Some aspects described herein relate to a non-transitory computer-readable medium that stores a set of instructions for wireless communication by a DU. The set of instructions, when executed by one or more processors of the DU, may cause the DU to receive, from a CU, a configuration for an MBS SFN area associated with the CU, the configuration indicating configuration information for one or more multicast channels. The set of instructions, when executed by one or more processors of the DU, may cause the DU to transmit, to one or more UEs in accordance with the configuration, a PDCCH communication scheduling an MBS SFN data communication that is associated with a multicast traffic channel. The set of instructions, when executed by one or more processors of the DU, may cause the DU to transmit, to the one or more UEs, the MBS SFN data communication via a PDSCH that is associated with both SFN communications and unicast communications or a PDSCH that is associated with only MBS SFN communications.

Some aspects described herein relate to a non-transitory computer-readable medium that stores a set of instructions for wireless communication by a CU. The set of instructions, when executed by one or more processors of the CU, may cause the CU to transmit, to one or more DUs, a configuration for an MBS SFN area associated with the CU, the configuration indicating a resource allocation for MBS SFN communications and a channel mapping for one or more multicast channels. The set of instructions, when executed by one or more processors of the CU, may cause the CU to transmit, to the one or more DUs, an MBS packet to be transmitted in accordance with the configuration.

Some aspects described herein relate to an apparatus for wireless communication. The apparatus may include means for receiving a configuration, for an MBS SFN area, indicating configuration information for one or more multicast traffic channels. The apparatus may include means for receiving, in accordance with the configuration, a PDCCH communication scheduling an MBS SFN data communication associated with a multicast traffic channel, of the one or more multicast traffic channels. The apparatus may include means for receiving the MBS SFN data communication via a PDSCH that is associated with both SFN communications and unicast communications or that is associated with only MBS SFN communications.

Some aspects described herein relate to an apparatus for wireless communication. The apparatus may include means for receiving, from a CU, a configuration for an MBS SFN area associated with the CU, the configuration indicating configuration information for one or more multicast channels. The apparatus may include means for transmitting, to one or more UEs in accordance with the configuration, a PDCCH communication scheduling an MBS SFN data communication that is associated with a multicast traffic channel. The apparatus may include means for transmitting, to the one or more UEs, the MBS SFN data communication via a PDSCH that is associated with both SFN communications and unicast communications or a PDSCH that is associated with only MBS SFN communications.

Some aspects described herein relate to an apparatus for wireless communication. The apparatus may include means for transmitting, to one or more DUs, a configuration for an MBS SFN area associated with the apparatus, the configuration indicating a resource allocation for MBS SFN communications and a channel mapping for one or more multicast channels. The apparatus may include means for transmitting, to the one or more DUs, an MBS packet to be transmitted in accordance with the configuration.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 6A is a diagram illustrating an example of MBS SFN areas in an access network, in accordance with the present disclosure.

FIG. 6B is a diagram illustrating an example of an MBS channel configuration in an MBS SFN, in accordance with the present disclosure.

DETAILED DESCRIPTION

Figure 1:
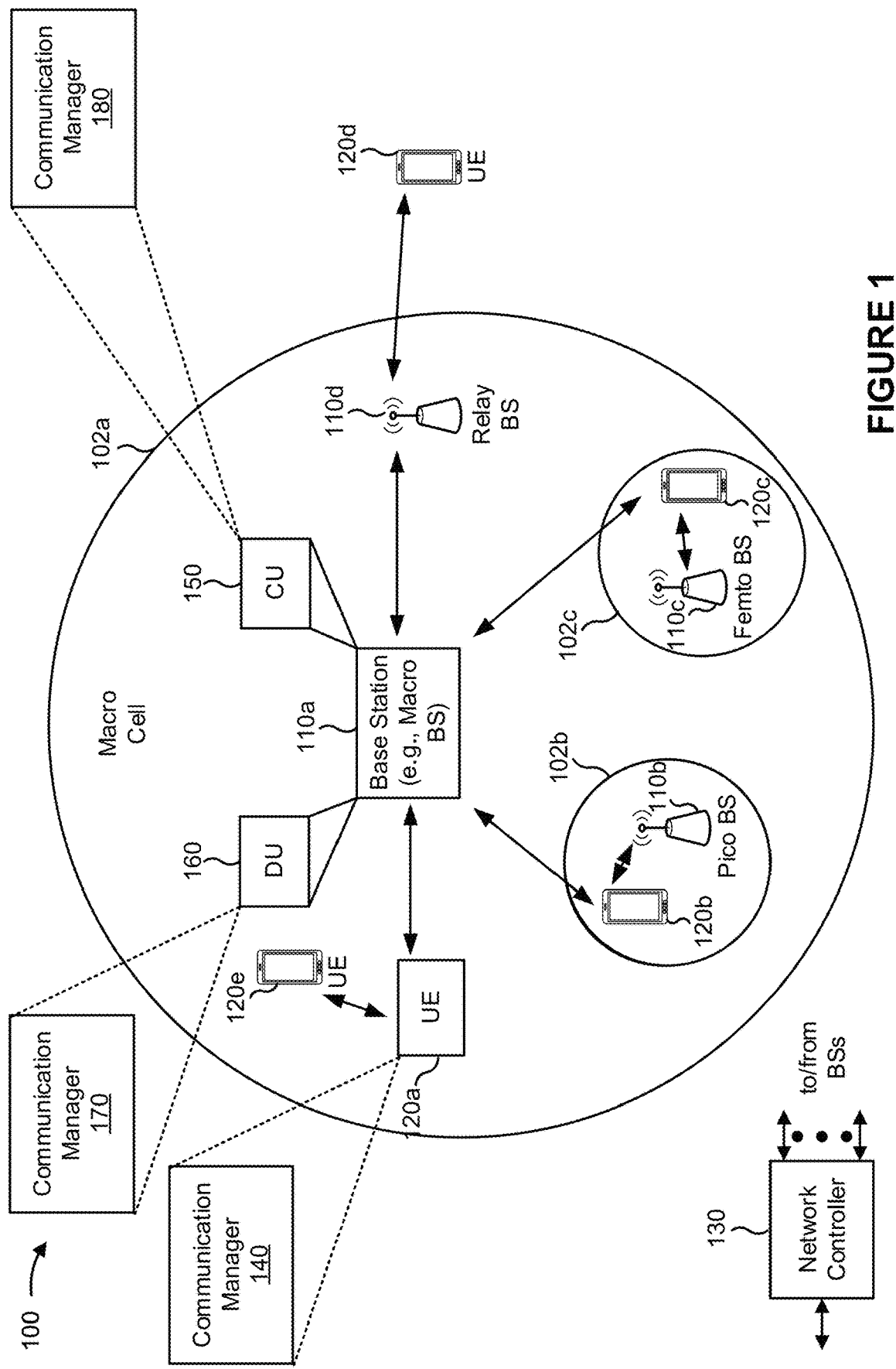
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to signaling for multicast broadcast (MBS) single frequency network (SFN) communications (for example, for wide area SFN). Some aspects more specifically relate to downlink channel mapping for MBS and unicast traffic, central unit (CU) coordination or configuration of an MBS SFN area (for example, that is associated with multiple distributed units (DUs)), or configuration information (for example, system information or radio resource control (RRC) configuration information) for an MBS SFN area (for example, that is associated with multiple DUs). In some aspects, a UE may receive an MBS SFN data communication via a physical downlink shared channel (PDSCH) that is associated with both SFN communications and unicast communications (for example, a shared PDSCH for both unicast and SFN communications). For example, a multicast broadcast control channel (MCCH) and a multicast broadcast traffic channel (MTCH) may be mapped to a downlink shared channel (DL-SCH) (for example, a transport channel) that is mapped to the PDSCH. In some other aspects, the UE may receive an MBS SFN data communication via a PDSCH that is associated with only MBS SFN communications. For example, the MCCH and the MTCH may be mapped to a multicast channel (MCH) DL-SCH that is mapped to an MBS SFN PDSCH.

In some aspects, a CU may communicate with one or more DUs to configure an MBS SFN area. For example, the configuration may indicate a resource allocation for MBS SFN communications and a channel mapping for one or more multicast channels. The resource allocation may indicate time-frequency resources or spatial resources (for example, beams) that are reserved for MBS SFN communications (for example, associated with a PDSCH). In some aspects, the configuration may indicate a resource partition for a PDSCH that indicates a partition of resources (for example, time-frequency resources or spatial resources) among multicast channels or unicast channels for the PDSCH. The configuration may be included in an F1 application protocol (AP) message, such as an F1 setup response message.

In some aspects, a UE may receive (for example, from a DU), a configuration, for an MBS SFN area, indicating configuration information for one or more multicast traffic channels. For example, the configuration may indicate one or more resources of the PDSCH that are reserved for SFN communications. The configuration information may include a resource allocation for the one or more multicast traffic channels, or a multicast channel scheduling period for the one or more multicast traffic channels, among other examples. In some aspects, the configuration may indicate an identifier associated with the MBS SFN area, a quantity of symbols in a subframe that are not associated with MBS SFN communications, an MCCH resource and cycle configuration, an MCCH change notification configuration, or an MCS that is to be applied to subframes associated with MCCH scheduling, among other examples. Additionally or alternatively, the configuration may indicate identifiers of the one or more multicast traffic channels, a resource allocation for each multicast traffic channel of the one or more multicast traffic channels, a multicast channel scheduling period for each multicast traffic channel of the one or more multicast traffic channels, or a DRX cycle for each multicast traffic channel of the one or more multicast traffic channels, among other examples.

Particular aspects of the subject matter described in this disclosure can be implemented to realize one or more of the following potential advantages. In some examples, the described techniques can be used to enable MBS SFN areas that are associated with multiple DUs. Enabling an MBS SFN area to be associated with multiple DUs may expand a coverage area for the MBS SFN area (for example, may enable the MBS SFN area to cover a larger geographic area). Additionally, the described techniques can be used to enable a CU to coordinate or configure an MBS SFN area among multiple DUs. This enables the CU and DUs to coordinate in order to transmit MBS signals in the MBS SFN area at the same time and using the same frequency resources, thereby improving a performance or reliability of the MBS SFN signals.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, functions of a base station 110 may be split into two physical entities, a central unit (CU) 150 and a distributed unit (DU) 160. The CU 150 may perform access node controller (ANC) functions or access and mobility functions (AMF). For example, the CU 150 may provide support for higher layers of a protocol stack of the base station, such as a Service Data Adaption Protocol (SDAP) layer, a Packet Data Convergence Protocol (PDCP) layer, or a radio resource control (RRC) layer, among other examples. The DU 160 may provide support for lower layers, such as a radio link control (RLC) layer, a medium access control (MAC) layer, or a physical (PHY) layer, among other examples. The CU 150 may communicate with a core network via a backhaul link. The CU 150 may configure one or more DUs 160. For example, the CU 150 may communicate with one or more DUs 160 via respective midhaul links. In some examples, a base station 110 may include, or be associated with, a CU 150 and a DU 160. In some other examples, a base station 110 may only be associated with a DU 160.

For example, in an integrated access and backhaul (IAB) network, a base station 110 may be an IAB donor. The IAB donor may include a CU 150 and a DU 160. The IAB donor may connects to the core network via a wired connection (such as a wireline backhaul). For example, an Ng interface of an IAB donor may terminate at a core network. Additionally or alternatively, an IAB donor may connect to one or more devices of the core network that provide a core AMF. The CU 150 may configure a DU 160 of the IAB donor and may configure one or more IAB nodes. An IAB node may connect to the core network via the IAB donor. An IAB node may include a DU and mobile termination (MT) functions (also sometimes referred to as UE functions (UEF)). The MT functions of an IAB node (for example, a child node) may be controlled or scheduled by another IAB node (such as a parent node of the child node) or by an IAB donor. The DU functions of an IAB node (for example, a parent node) may control or schedule other IAB nodes (for example, child nodes of the parent node) or UEs 120. Thus, a DU may be referred to as a scheduling node or a scheduling component, and an MT may be referred to as a scheduled node or a scheduled component. In some examples, an IAB donor may include DU functions and not MT functions. That is, an IAB donor may configure, control, or schedule communications of IAB nodes or UEs 120. A UE 120 may include only MT functions, and not DU functions. That is, communications of a UE 120 may be controlled or scheduled by an IAB donor or an IAB node (for example, a parent node of the UE 120).

As another example, the wireless network 100 may be associated with an open radio access network (O-RAN) architecture. The O-RAN architecture may include the CU 150 that communicates with the core network via a backhaul link. Furthermore, the CU 150 may communicate with one or more DUs 160 via respective midhaul links. The DUs 160 may each communicate with one or more remote units (RUs) via respective fronthaul links, and the RUs may each communicate with respective UEs 120 via radio frequency (RF) access links. In some examples, the DUs 160 and the RUs may be implemented according to a functional split architecture in which functionality of a base station 110 is provided by a DU 160 and one or more RUs that communicate over a fronthaul link. Accordingly, as described herein, a base station 110 may include a DU 160 and one or more RUs that may be co-located or geographically distributed. In some examples, the DU 160 and the associated RU(s) may communicate via a fronthaul link to exchange real-time control plane information via a lower layer split (LLS) control plane (LLS-C) interface, to exchange non-real-time management information via an LLS management plane (LLS-M) interface, or to exchange user plane information via an LLS user plane (LLS-U) interface. Accordingly, the DU 160 may correspond to a logical unit that includes one or more base station functions to control the operation of one or more RUs. For example, the DU 160 may host an RLC layer, a MAC layer, and one or more high PHY layers (for example, forward error correction (FEC) encoding and decoding, scrambling, or modulation and demodulation) based at least in part on a lower layer functional split. Higher layer control functions, such as a PDCP, RRC, or SDAP, may be hosted by the CU 150. The RU(s) controlled by a DU 160 may correspond to logical nodes that host RF processing functions and low-PHY layer functions (for example, fast Fourier transform (FFT), inverse FFT (iFFT), digital beamforming, or physical random access channel (PRACH) extraction and filtering) based at least in part on the lower layer functional split. Accordingly, in an O-RAN architecture, the RU(s) handle all over the air (OTA) communication with a UE 120, and real-time and non-real-time aspects of control and user plane communication with the RU(s) are controlled by the corresponding DU 160, which enables the DU(s) 160 and the CU 150 to be implemented in a cloud-based RAN architecture.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive a configuration, for an MBS SFN area, indicating configuration information for one or more multicast traffic channels; receive, in accordance with the configuration, a physical downlink control channel (PDCCH) communication scheduling an MBS SFN data communication associated with a multicast traffic channel, of the one or more multicast traffic channels; and receive the MBS SFN data communication via a PDSCH that is associated with both SFN communications and unicast communications or that is associated with only MBS SFN communications. Additionally or alternatively, the communication manager 140 may perform one or more other operations described herein.

In some aspects, the DU 160 may include a communication manager 170. As described in more detail elsewhere herein, the communication manager 170 may receive, from a CU, a configuration for an MBS SFN area associated with the CU, the configuration indicating configuration information for one or more multicast channels; transmit, to one or more UEs in accordance with the configuration, a PDCCH communication scheduling an MBS SFN data communication that is associated with a multicast traffic channel; and transmit, to the one or more UEs, the MBS SFN data communication via a PDSCH that is associated with both SFN communications and unicast communications or a PDSCH that is associated with only MBS SFN communications. Additionally or alternatively, the communication manager 170 may perform one or more other operations described herein.

In some aspects, the CU 150 may include a communication manager 180. As described in more detail elsewhere herein, the communication manager 180 may transmit, to one or more DUs, a configuration for an MBS SFN area associated with the CU, the configuration indicating a resource allocation for MBS SFN communications and a channel mapping for one or more multicast channels; and transmit, to the one or more DUs, an MBS packet to be transmitted in accordance with the configuration. Additionally or alternatively, the communication manager 180 may perform one or more other operations described herein.

Figure 2:
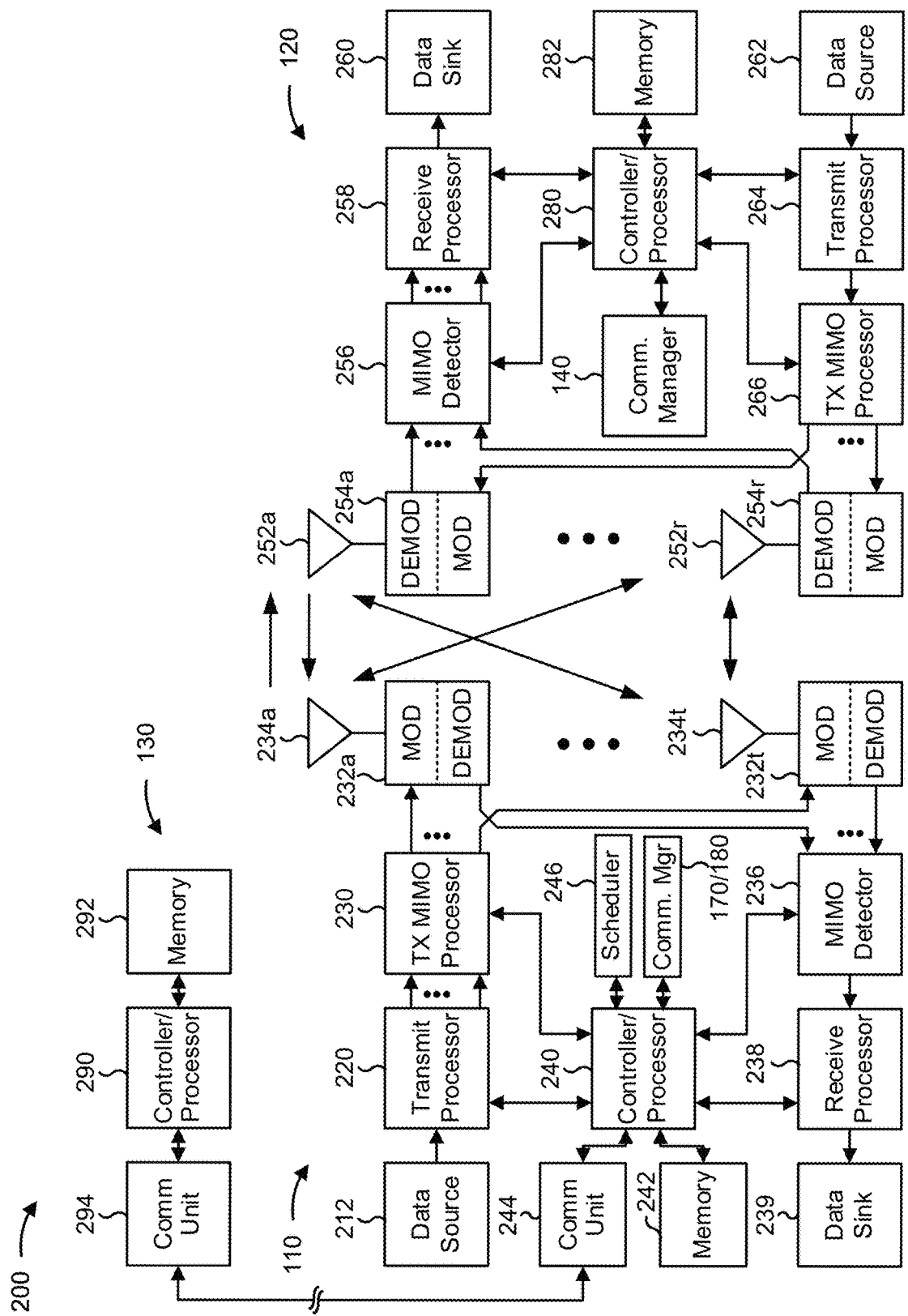
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the base station 110 or other base stations 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with signaling for MBS SFN communications, as described in more detail elsewhere herein. In some aspects, the DU described herein is the base station 110, is included in the base station 110, or includes one or more components of the base station 110 as shown in FIG. 2. In some aspects, the CU described herein is the base station 110, is included in the base station 110, or includes one or more components of the base station 110 as shown in FIG. 2.

Figure 10:
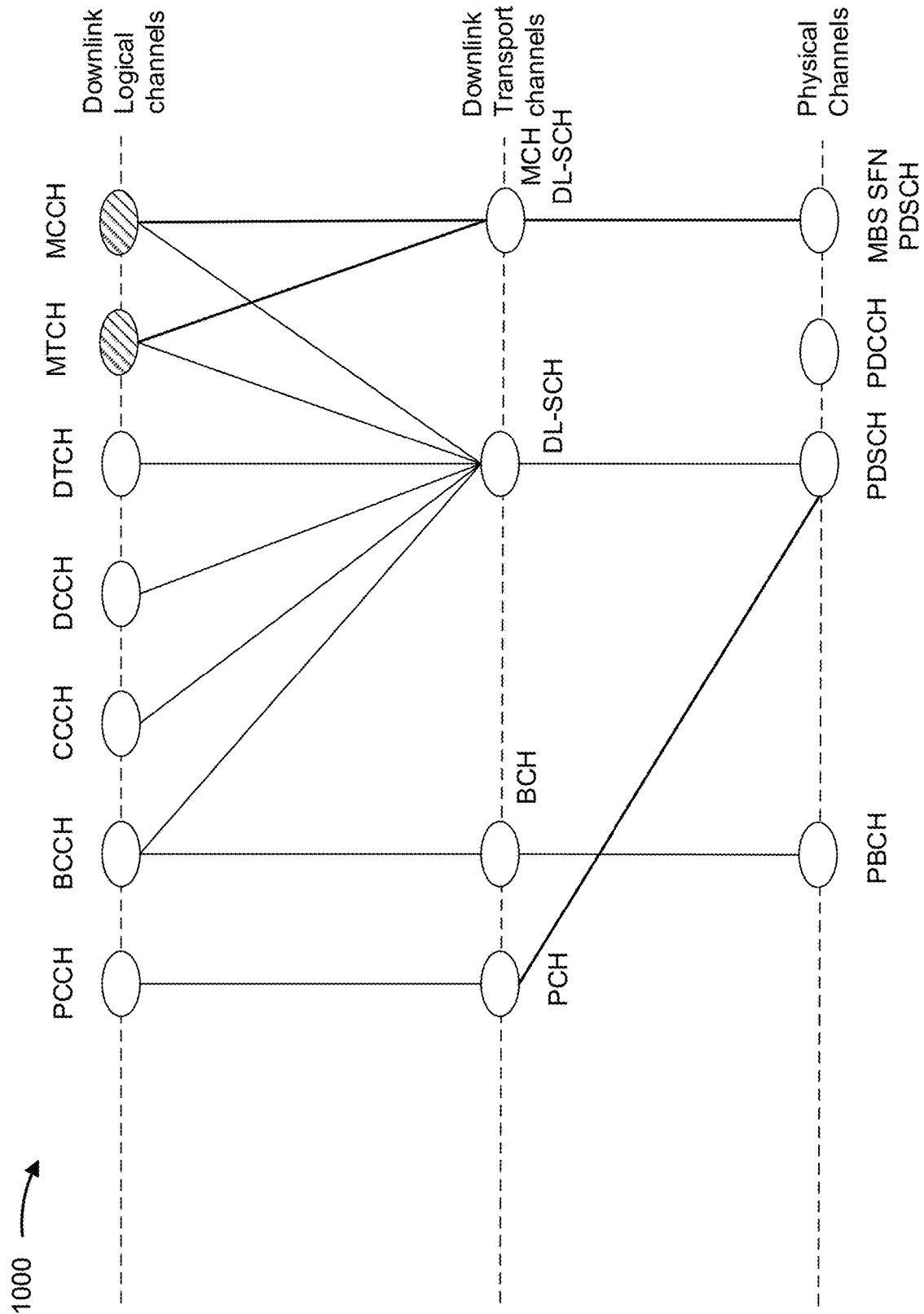
FIG. 10 is a diagram illustrating an example associated with channel mapping for MBS SFN communications, in accordance with the present disclosure.
Figure 11:
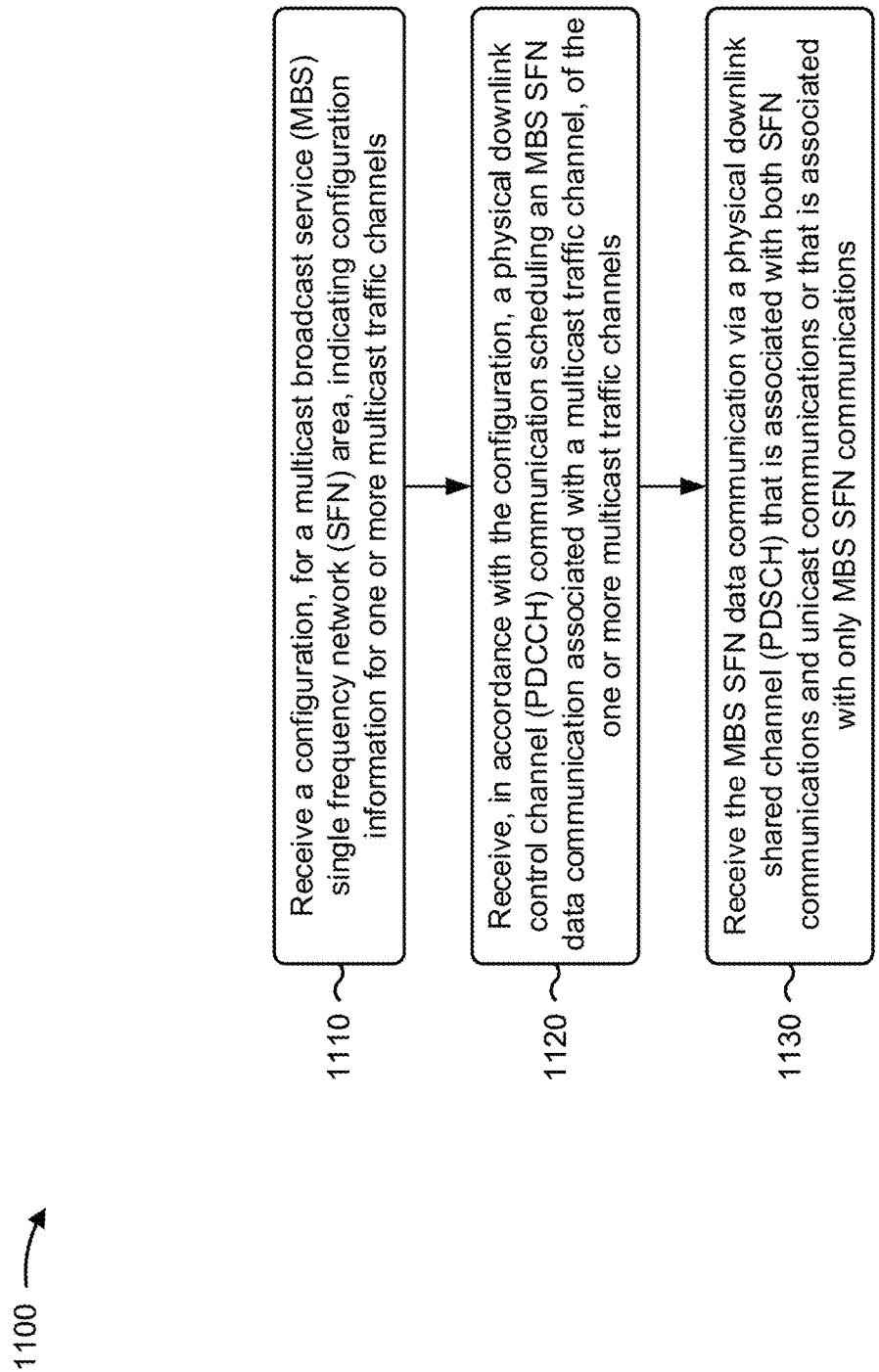
FIG. 11 is a flowchart illustrating an example process performed, for example, by a UE, associated with signaling for MBS SFN communications, in accordance with the present disclosure.
Figure 12:
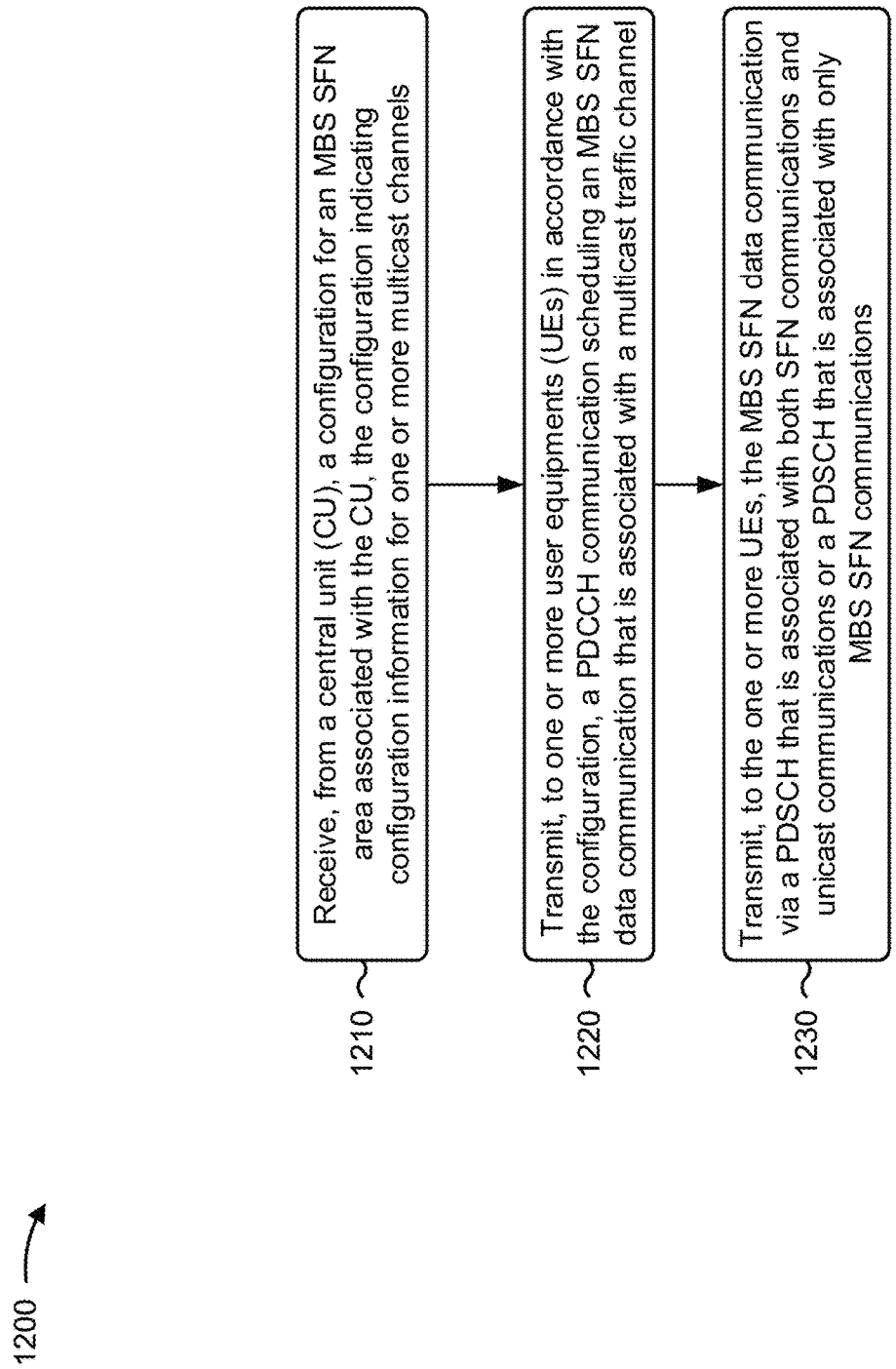
FIG. 12 is a flowchart illustrating an example process performed, for example, by a distributed unit (DU), associated with signaling for MBS SFN communications, in accordance with the present disclosure.

The controller/processor 240 of the base station 110, the controller/processor 280 of the UE 120, or any other component(s) of FIG. 2 may perform or direct operations of, for example, process 1000 of FIG. 10, process 1100 of FIG. 11, process 1200 of FIG. 12, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1000 of FIG. 10, process 1100 of FIG. 11, process 1200 of FIG. 12, or other processes as described herein. In some examples, executing instructions may include running the instructions, converting the instructions, compiling the instructions, or interpreting the instructions, among other examples.

In some aspects, the UE 120 includes means for receiving a configuration, for an MBS SFN area, indicating configuration information for one or more multicast traffic channels; means for receiving, in accordance with the configuration, a PDCCH communication scheduling an MBS SFN data communication associated with a multicast traffic channel, of the one or more multicast traffic channels; or means for receiving the MBS SFN data communication via a PDSCH that is associated with both SFN communications and unicast communications or that is associated with only MBS SFN communications. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the DU 160 includes means for receiving, from a CU, a configuration for an MBS SFN area associated with the CU, the configuration indicating configuration information for one or more multicast channels; means for transmitting, to one or more UEs in accordance with the configuration, a PDCCH communication scheduling an MBS SFN data communication that is associated with a multicast traffic channel; or means for transmitting, to the one or more UEs, the MBS SFN data communication via a PDSCH that is associated with both SFN communications and unicast communications or a PDSCH that is associated with only MBS SFN communications. In some aspects, the means for the DU 160 to perform operations described herein may include, for example, one or more of communication manager 170, transmit processor 220, TX MIMO processor 230, modem 232, antenna 234, MIMO detector 236, receive processor 238, controller/processor 240, memory 242, or scheduler 246.

In some aspects, the CU 150 includes means for transmitting, to one or more DUs, a configuration for an MBS SFN area associated with the CU 150, the configuration indicating a resource allocation for MBS SFN communications and a channel mapping for one or more multicast channels; or means for transmitting, to the one or more DUs, an MBS packet to be transmitted in accordance with the configuration. In some aspects, the means for the CU 150 to perform operations described herein may include, for example, one or more of communication manager 180, transmit processor 220, TX MIMO processor 230, modem 232, antenna 234, MIMO detector 236, receive processor 238, controller/processor 240, memory 242, or scheduler 246.

Figure 3:
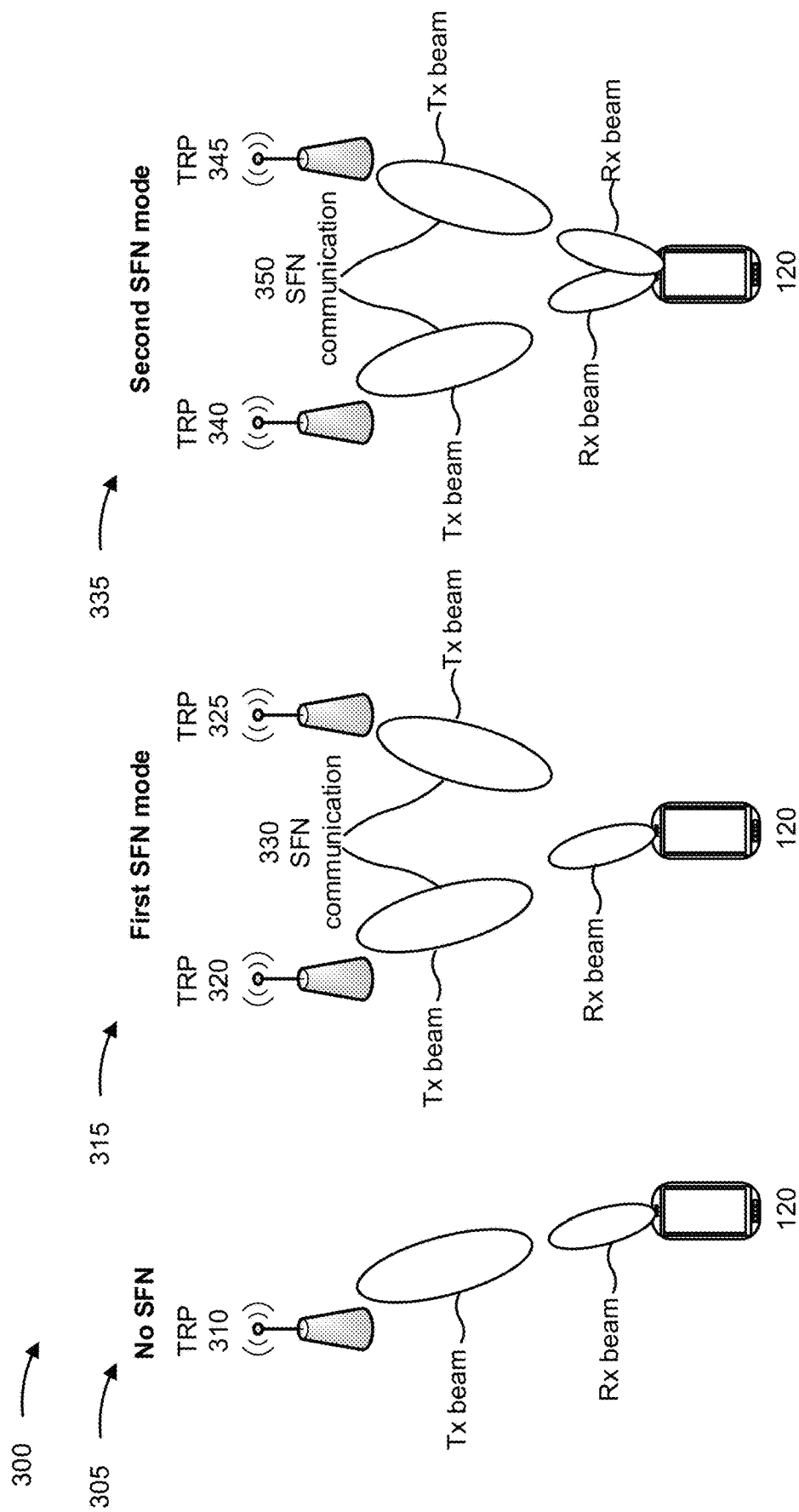
FIG. 3 is a diagram illustrating an example associated with single frequency network (SFN) communication, in accordance with the present disclosure.

FIG. 3 is a diagram illustrating an example associated with SFN communication 300, in accordance with the present disclosure. As shown in FIG. 3, an example of communications associated with a non-SFN configuration 305 is depicted. A TRP 310 may transmit communications using a transmit (Tx) beam to the UE 120. The transmit beam may be associated with a TCI state. The UE 120 may receive communications (for example, transmitted by the TRP 310) using a receive (Rx) beam. For example, the UE 120 may identify the TCI state associated with the transmit beam and may use information provided by the TCI state to receive the communications.

As further shown in FIG. 3, an example of a first SFN mode 315 is depicted. A first TRP 320 (or a first base station 110) and a second TRP 325 (or a second base station 110) may transmit an SFN communication 330 to the UE 120. For example, the first TRP 320 and the second TRP 325 may transmit substantially the same information (for example, the SFN communication 330) to the UE 120 using the same frequency domain resources and the same time domain resources. The first TRP 320 may transmit the SFN communication 330 using a first transmit beam. The second TRP 325 may transmit the SFN communication 330 using a second transmit beam. In the first SFN mode 315, the UE 120 may be unaware that the SFN communication 330 is transmitted on separate transmit beams (for example, from different TRPs or different base stations 110). Accordingly, when the multiple base stations (or multiple TRPs) simultaneously transmit the same signal to a UE 120, the SFN configuration may be transparent to the UE 120, and the UE 120 may aggregate, or accumulate, the simultaneous signal transmissions from the multiple TRPs (or multiple base stations 110), which may provide higher signal quality or higher tolerance for multipath attenuation, among other benefits. For example, the UE 120 may receive the SFN communication 330 using a single receive beam (for example, may use a single spatial receive direction, among other examples, to receive the SFN communication 330). In other words, transmission configuration indicator (TCI) states of the different transmit beams used to transmit the SFN communication 330 may not be signaled to the UE 120.

As further shown in FIG. 3, an example of a second SFN mode 335 is depicted. In the second SFN mode 335, a first TRP 340 (or a first base station 110) and a second TRP 345 (or a second base station 110) may transmit an SFN communication 350 to the UE 120. For example, the first TRP 340 and the second TRP 345 may transmit substantially the same information (for example, the SFN communication 350) to the UE 120 using the same frequency domain resources and the same time domain resources. The first TRP 340 may transmit the SFN communication 350 using a first transmit beam. The second TRP 345 may transmit the SFN communication 350 using a second transmit beam. In the second SFN mode 335, the UE 120 may be aware that the SFN communication 350 is transmitted on separate transmit beams (for example, from different TRPs or different base stations 110). For example, a first TCI state of the first transmit beam (for example, associated with the first TRP 340) and a second TCI state of the second transmit beam (for example, associated with the second TRP 345) may be signaled to the UE 120. For example, a base station 110 may transmit configuration information that indicates that the SFN communication 350 may be a combination of transmissions from different TRPs or different transmit beams. The UE 120 may use the information associated with the different TRPs or different transmit beams (for example, the first TCI state and the second TCI state) to improve a reception performance of the SFN communication 350. For example, as shown in FIG. 3, the UE 120 may use different spatial directions (for example, different receive beams) to receive the SFN communication 350 based at least in part on the TCI states of the transmit beam(s) associated with the SFN communication 350. This may improve a performance of the UE 120 because the UE 120 may receive the SFN communication 350 from different transmit beams or different TRPs with improved signal strength or signal quality, among other examples.

In some examples, an SFN communication may be an MBS SFN communication. In other words, an SFN communication may be a broadcast or multicast communication that is transmitted to multiple UEs 120. In some cases, a multicast communication may be a communication of information to a plurality (for example, a set) of UEs 120. In some cases, each of the UEs 120 may need to join a multicast session prior to receiving information using the multicast communication. For example, the UEs 120 may join the multicast session using non-access stratum (NAS) based signaling. In some cases, the UEs 120 may need to be authorized, or authenticated, prior to joining the multicast session. For example, the base station 110 may indicate to a UE 120, of the set of UEs 120, whether the UE 120 is authorized or authenticated prior to the UE 120 joining the multicast session and receiving information via a multicast communication. In some cases, not all of the UEs 120 within an area (for example, a multicast service area) may receive the information via the multicast communication. For example, the base station 110 may transmit the information to a subset of the UEs 120, of the set of UEs 120, within the multicast service area. In some cases, a UE 120 in the multicast service area that has not been authorized or authenticated may not receive the information via the multicast communication. In some cases, the base station 110 is aware of whether or not individual UEs 120, of the set of UEs 120, have received the information using the multicast communication. In some cases, the multicast communication may be referred to as a "one-to-many" communication.

In some cases, a broadcast communication may be a communication of information to all UEs 120 within an area (for example, a broadcast service area). The UEs 120 may not need to join a session prior to receiving the information using the broadcast communication. For example, the UEs 120 do not need to access a session using NAS based signaling prior to receiving the information using the broadcast communication. In some cases, the UEs 120 may not need to be authorized, or authenticated, prior to receiving information via a broadcast communication. In some cases, the base station 110 may transmit the information to all of the UEs 120 within the broadcast service area. For example, the base station 110 may not be able to broadcast the information to only a subset of the UEs 120. In some cases, the base station 110 may not be aware of whether or not individual UEs 120, of the set of UEs 120, have received the information using the broadcast communication. In some cases, the broadcast communication may be referred to as a "one-to-all" communication.

Figure 4:
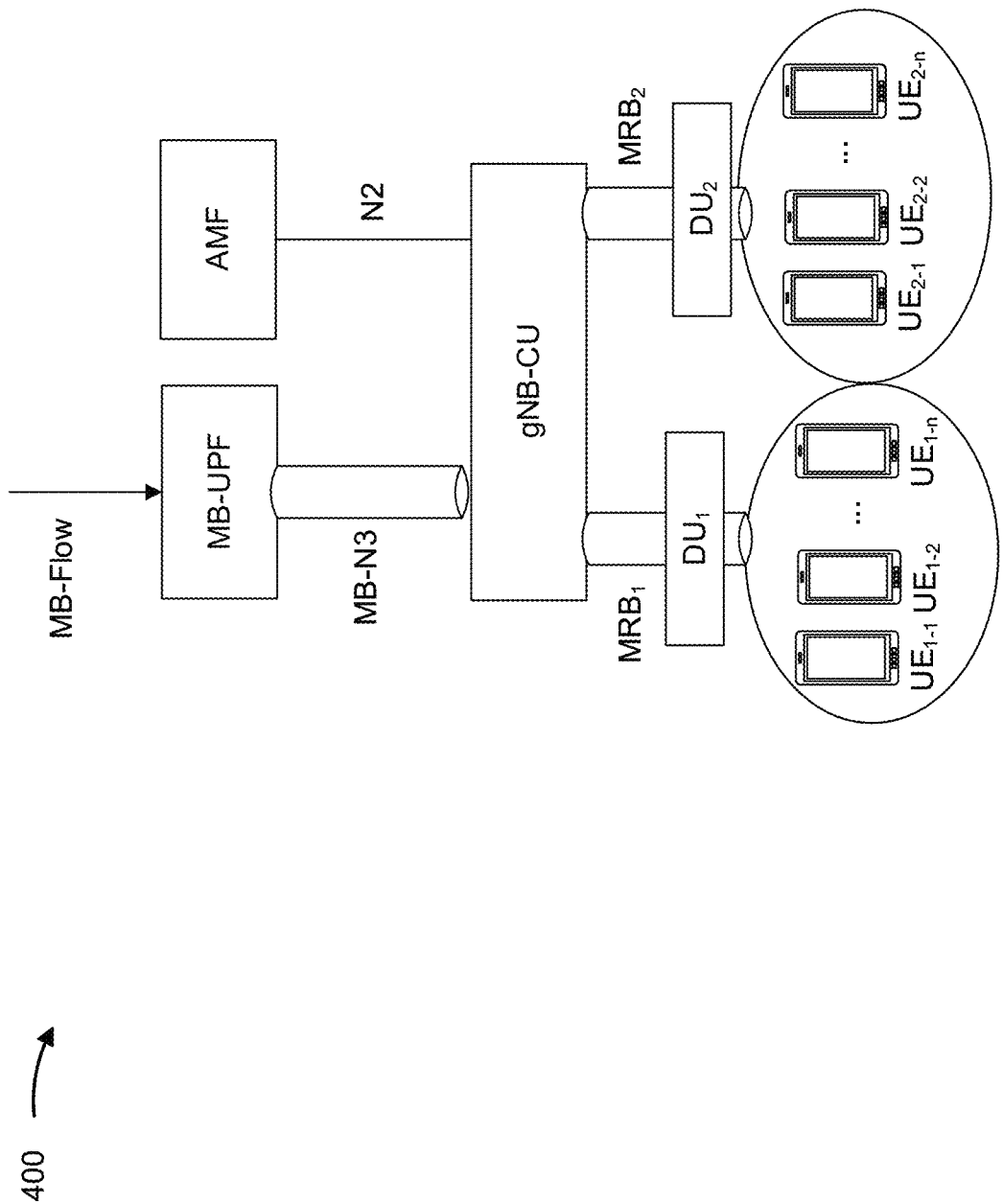
FIG. 4 is a diagram illustrating an example of a multicast broadcast service (MBS) architecture, in accordance with the present disclosure.

FIG. 4 is a diagram illustrating an example of an MBS architecture 400, in accordance with the present disclosure. In some examples, the multicast broadcast service architecture may be deployed in a wireless network (for example, wireless network 100) to support multicast or broadcast services to simultaneously disseminate data, such as emergency alerts or audio or video content, among many other possibilities, to multiple UEs that may be located in the same or different cells. In general, because multicast broadcast operations enable multiple UEs to receive the same data at substantially the same time, multicast operations can significantly reduce network overhead relative to unicast operations in which a particular transmission is received by only one UE.

In a wireless network, MBS operations may be supported using enhanced multimedia broadcast/multicast service (eMBMS), single-cell point-to-multipoint (SC-PTM) services, multimedia broadcast multicast service over single frequency network (MBSFN), or enhanced TV (EnTV), among other examples. For example, in eMBMS, multicast data is transmitted in multiple cells to a group of UEs located in a particular area. In SC-PTM, multicast data is transmitted in a particular cell and the multicast data is received by a group of UEs that are located in the particular cell. In an NR network, a UE may receive multicast broadcast services in mixed mode or broadcast mode. For example, in mixed mode, a UE in an RRC connected mode may receive multicast broadcast service using a multicast broadcast radio bearer (MRB) or a dedicated radio bearer (DRB). In broadcast mode, a UE may receive multicast broadcast service using an MRB in an RRC connected mode, an RRC idle mode, or an RRC inactive mode.

As shown in FIG. 4, the MBS architecture 300 may include a multicast broadcast user plane function (MB-UPF) that receives (for example, from an application server) a multicast broadcast (MB) flow including content to be multicasted or broadcasted. As further shown, the multicast broadcast service architecture may include a centralized base station unit (gNB-CU), such as a CU, that receives the MB flow and a temporary mobile group identity (TMGI) associated with the MB flow from the MB-UPF over an MB-N3 tunnel (for example, a user plane interface for delivering the MB flow and the corresponding TMGI using a general packet radio service tunneling protocol (GTP)). Furthermore, the gNB-CU may communicate with an AMF that manages UE network registration, manages mobility, maintains non-access stratum (NAS) signaling connections, or manages UE registration procedures, among other examples. For example, the gNB-CU may communicate with the AMF over an N2 interface that enables control signaling to establish or modify the MB flow or the TMGI.

In some examples, the gNB-CU may map the MB flow received from the MB-UPF to an MRB or a DRB based at least in part on the TMGI associated with the MB flow, and the gNB-CU may forward the MB flow to a DU that may include one or more TRPs, which may multicast or broadcast the content included in the MB flow to one or more UEs via an MRB. Additionally or alternatively, the DU may transmit the content included in the MB flow to one or more UEs via a DRB. In this way, the multicast broadcast service architecture may flexibly switch between transmitting content to UEs via a DRB (or a unicast bearer) and an MRB, and may provide unicast assistance to the MRB at lower layers to improve reliability or reduce service disruption.

Figure 5:
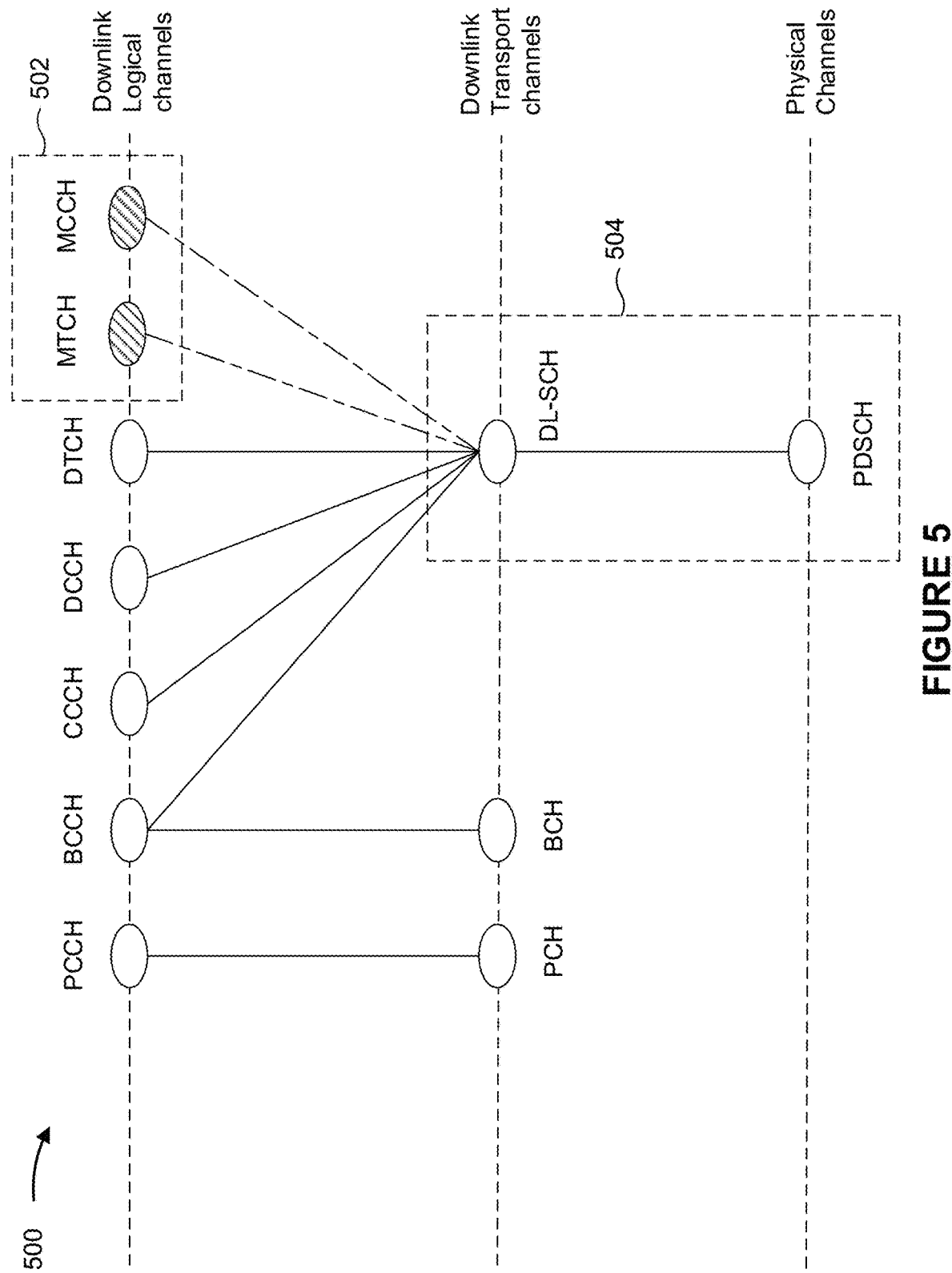
FIG. 5 is a diagram illustrating an example of a channel mapping for MBS communications, in accordance with the present disclosure.

FIG. 5 is a diagram illustrating an example of a channel mapping 500 for MBS communications, in accordance with the present disclosure. As shown by MBS channels 502, multicast or broadcast transmissions in an NR network may be supported using a multicast broadcast traffic channel (MTCH) and a multicast broadcast control channel (MCCH). The MTCH may carry multicast or broadcast data, while the MCCH may carry configuration information or control information for multicast or broadcast communications to be transmitted on the MTCH. An MBS communication on the MTCH may be addressed to a group of UEs using a group common radio network temporary identifier (G-RNTI).

In some examples, different MTCHs may be used to carry multicast broadcast traffic with different quality of service (QoS) requirements. A multicast broadcast traffic flow with associated QoS requirements or QoS parameters (for example, a group of related packets for the same multicast broadcast service) may be referred to as an MB-QoS flow. In some examples, there may be a one-to-one mapping between MB-QoS flows and MTCHs. A base station or a core network device may configure a multicast broadcast radio bearer (MRB) for an MB-QoS flow. In some examples, there may be a one-to-one mapping between MB-QoS flows and MRBs. Accordingly, each MTCH may correspond to an MRB for carrying an MB-QoS flow.

The MCCH may carry configuration information for configuring the MTCHs, and may be addressed to all UEs in a cell (for example, a physical cell or a virtual cell) using a single cell RNTI (SC-RNTI). In some examples, there may be a single MCCH per cell (physical cell or virtual cell), and the MCCH may carry MTCH configuration information for multiple multicast broadcast services with different MB-QoS flows. As shown by channel mapping 504, the MCCH and the MTCH are logical channels, and may be mapped to a downlink shared channel (DL-SCH) transport channel, which may be mapped to a physical downlink shared channel (PDSCH).

FIG. 6A is a diagram illustrating an example of MBS SFN areas 610 in an access network, in accordance with the present disclosure. The nodes 615 in cells 620 may form a first MBS SFN area and the nodes 625 in cells 630 may form a second MBS SFN area. The nodes 615, 625 may each be associated with other MBS SFN areas. A node 615, 625 may be base station 110, a DU, or a CU. A cell within an MBS SFN area may be designated a reserved cell. Reserved cells may not provide multicast/broadcast content, but may be time-synchronized to the cells 620, 630 and may have restricted power on MBS SFN resources in order to limit interference to the MBS SFN areas. Each node in an MBS SFN area synchronously transmits the same MBS control information and data. For example, the cells (for example, nodes 625) may transmit transmissions 635, 640, and 645 at the same time (for example, synchronously) and with the same frequency resources, and the transmissions may include the same control or data (for example, in an SFN manner). The UE 120 may receive the transmissions 635, 640, and 645 as though the transmissions were from a single cell (for example, based at least in part on the synchronous transmission of the same information using the same frequency resources in the SFN manner). Each MBS SFN area may support broadcast, multicast, and unicast services. A unicast service is provided for a specific receiver or UE. A multicast service is a service that may be received by a group of receivers or UEs, such as a subscription video service. A broadcast service is a service that may be received by all receivers or UEs. Referring to FIG. 6A, the first MBS SFN area may support a first MBS. The second MBS SFN area may support a second MBS broadcast service.

FIG. 6B is a diagram illustrating an example of an MBS channel configuration 650 in an MBS SFN, in accordance with the present disclosure. As shown in FIG. 6B, each MBS SFN area supports one or more physical multicast channels (PMCH) or a physical downlink control channel (PDCCH) scheduled PDSCH. Each PMCH or PDCCH scheduled PDSCH corresponds to a multicast channel (MCH) or DL-SCH. Each MCH or DL-SCH can multiplex a plurality of multicast logical channels. Each MBS SFN area may have one multicast control channel (MCCH). Therefore, one MCH or DL-SCH may multiplex one or more MCCH and a plurality of MTCHs and the remaining MCHs or DL-SCH may multiplex a plurality of MTCHs.

A UE can camp on a cell to discover the availability of an MBS service access and a corresponding configuration. Initially, the UE may acquire system information, and based at least in part on the system information may acquire an MBS SFN area configuration message on an MCCH. The system information may include an MBS SFN area identifier of each MBS SFN area supported by the cell, information for acquiring the MCCH such as an MCCH repetition period, an MCCH offset, an MCCH modification period, a signaling MCS, subframe allocation information indicating which subframes of the radio frame as indicated by repetition period and offset can transmit MCCH; or an MCCH change notification configuration. The MBS SFN area configuration message may indicate a group identity, one or more session identifiers, allocated resources for each PMCH, an MCH scheduling period, or dynamic PDCCH based PDSCH scheduling, etc. The UE may receive control information that indicates, for example, a starting point for each scheduling period of a PMCH, a channel identifier, or a field indicating an end of the MTCH.

An SFN may improve gain by turning inter-cell interference into a useful signal that may assist a UE in receiving downlink data. For example, the SFN may transmit the same downlink signal from multiple cells at the same time and using the same frequency resources. Although the signal is transmitted by different cells, a UE receiving the signal may receive the signal as a signal from a single cell, and the transmissions from other cells may improve the signal received by the UE. SFN transmission involves inter-cell coordination in order to transmit the signal at the same time and using the same frequency resources. In some cases, the signal that is transmitted in the SFN may include MBS data. In some examples, the multiple cells transmitting the MBS as an SFN may correspond to a same DU. For example, in FIG. 6A, the cells 620 may correspond to a first DU, and the cells 630 may correspond to a second DU. The intra-DU SFN may provide a small area SFN among cells connected to the same DU. A small area SFN may be associated with a small geographic area associated with the MBS SFN area. In order to support a larger geographic area for MBS SFN communications, an MBS SFN area may be associated with multiple DUs (for example, an inter-DU MBS SFN area) or multiple CUs (for example, an inter-CU MBS SFN area). For example, a wide area SFN may be associated with an intra-CU, inter-DU MBS SFN area (for example, associated with a single CU and multiple DUs) or an inter-CU, inter-DU MBS SFN area (for example, associated with multiple CUs and multiple DUs). To support the wide area SFN, coordination among multiple DUs or multiple CUs may be needed to facilitate transmitting an MBS signal, from multiple DUs or multiple cells, at the same time and using the same frequency resources. However, signaling and coordination among multiple CUs or multiple DUs to support a wide MBS SFN area is not defined. Therefore, a wireless network may be unable to support the wide MBS SFN area. Additionally or alternatively, the lack of signaling or coordination among multiple CUs or multiple DUs to support a wide MBS SFN area may result in degraded performance or reliability associated with MBS SFN communications in the wide MBS SFN area.

Various aspects relate generally to signaling for MBS SFN communications (for example, for wide area SFN). Some aspects more specifically relate to downlink channel mapping for MBS and unicast traffic, CU coordination or configuration of an MBS SFN area (for example, that is associated with multiple DUs), or configuration information (for example, system information or RRC configuration information) for an MBS SFN area (for example, that is associated with multiple DUs). In some aspects, a UE may receive an MBS SFN data communication via a PDSCH that is associated with both SFN communications and unicast communications (for example, a shared PDSCH for both unicast and SFN communications). For example, the MCCH and the MTCH may be mapped to a DL-SCH that is mapped to the PDSCH. In some other aspects, the UE may receive an MBS SFN data communication via a PDSCH that is associated with only MBS SFN communications. For example, the MCCH and the MTCH may be mapped to an MCH DL-SCH that is mapped to an MBS SFN PDSCH.

In some aspects, a CU may communicate with one or more DUs to configure an MBS SFN area. For example, the configuration may indicate a resource allocation for MBS SFN communications and a channel mapping for one or more multicast channels. The resource allocation may indicate time-frequency resources or spatial resources (for example, beams) that are reserved for MBS SFN communications (for example, associated with a PDSCH). In some aspects, the configuration may indicate a resource partition for a PDSCH that indicates a partition of resources (for example, time-frequency resources or spatial resources) among multicast channels or unicast channels for the PDSCH. The configuration may be included in an F1AP message, such as an F1 setup response message.

In some aspects, a UE may receive (for example, from a DU), a configuration, for an MBS SFN area, indicating configuration information for one or more multicast traffic channels. For example, the configuration may indicate one or more resources of the PDSCH that are reserved for SFN communications. The configuration information may include a resource allocation for the one or more multicast traffic channels, or a multicast channel scheduling period for the one or more multicast traffic channels, among other examples. In some aspects, the configuration may indicate an identifier associated with the MBS SFN area, a quantity of symbols in a subframe that are not associated with MBS SFN communications, an MCCH resource and cycle configuration, an MCCH change notification configuration, or an MCS that is to be applied to subframes associated with MCCH scheduling, among other examples. Additionally or alternatively, the configuration may indicate identifiers of the one or more multicast traffic channels, a resource allocation for each multicast traffic channel of the one or more multicast traffic channels, a multicast channel scheduling period for each multicast traffic channel of the one or more multicast traffic channels, or a DRX cycle for each multicast traffic channel of the one or more multicast traffic channels, among other examples.

Particular aspects of the subject matter described in this disclosure can be implemented to realize one or more of the following potential advantages. In some examples, the described techniques can be used to enable MBS SFN areas that are associated with multiple DUs. Enabling an MBS SFN area to be associated with multiple DUs may expand a coverage area for the MBS SFN area (for example, may enable the MBS SFN area to cover a larger geographic area). Additionally, the described techniques can be used to enable a CU to coordinate or configure an MBS SFN area among multiple DUs. This enables the CU and DUs to coordinate in order to transmit MBS signals in the MBS SFN area at the same time and using the same frequency resources, thereby improving a performance or reliability of the MBS signals.

Figure 7:
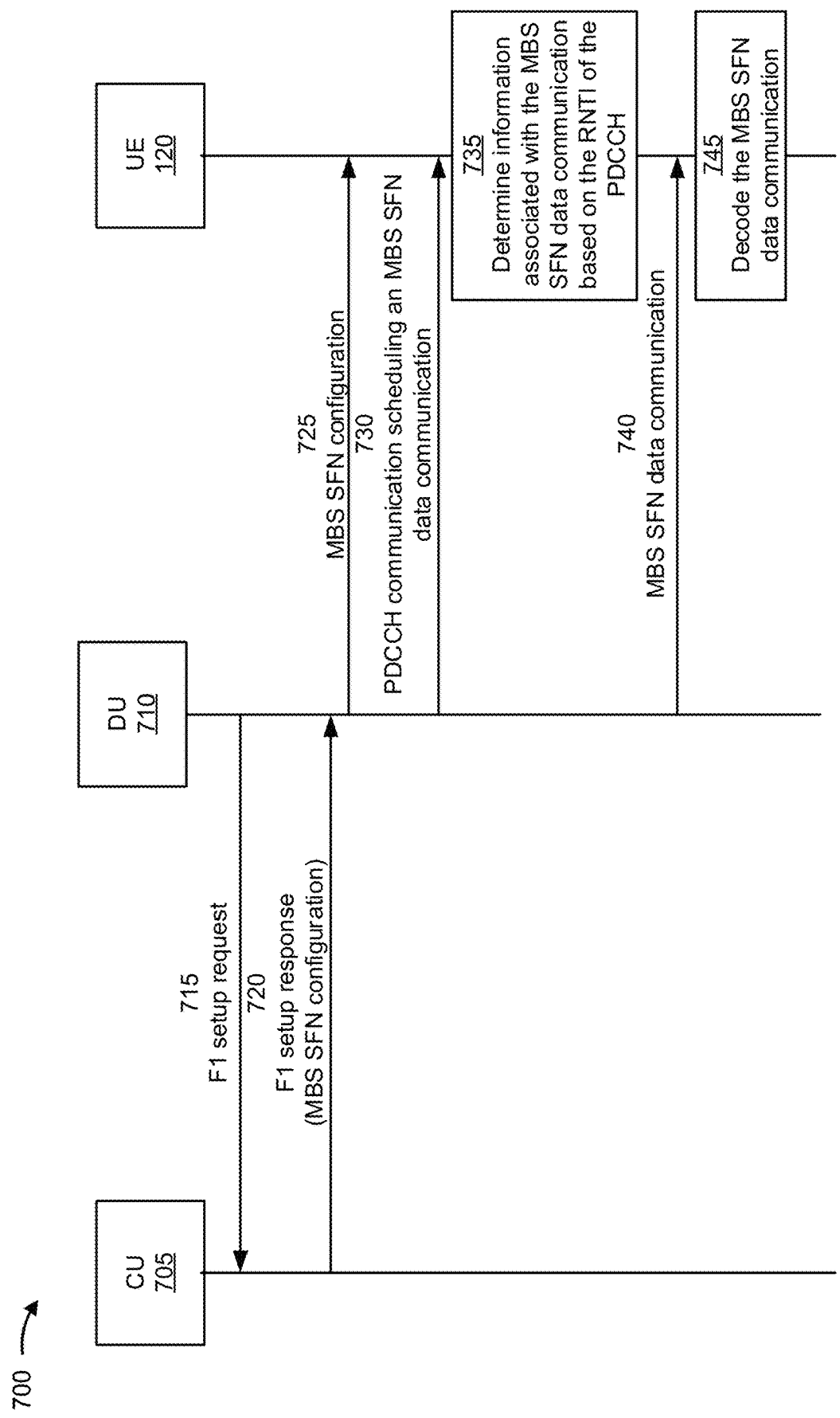
FIG. 7 is a diagram illustrating an example associated with signaling for MBS SFN communications, in accordance with the present disclosure.

FIG. 7 is a diagram illustrating an example associated with signaling 700 for MBS SFN communications, in accordance with the present disclosure. As shown in FIG. 7, a CU 705, a DU 710, and a UE 120 may communicate with one another in a wireless network, such as the wireless network 100. The CU 705 and the DU 710 may perform operations or functions associated with a base station 110 (for example, functions associated with a base station 110 may be split among the CU 705 and the DU 710 as explained in more detail elsewhere herein). In some aspects, the CU 705 may communicate with multiple DUs 710 (for example, in a similar manner as described herein). Similarly, the DU 710 may communicate with multiple UEs 120 (for example, in a similar manner as described herein). The CU 705 and the DU 710 may be connected via an F1 interface. The DU 710 and the UE 120 may be connected via a fronthaul interface. The CU 705 may also be referred to as a gNB-CU and the DU 710 may also be referred to as a gNB-DU.

In some aspects, the CU 705 may configure MBS SFN configuration information for the DU 710 as part of an F1 setup procedure. The F1 setup procedure may be an exchange of application level data needed for the DU 710 and the CU 705 to correctly interoperate on the F1 interface. For example, the CU 705 may configure MBS SFN configuration information for an MBS SFN area (for example, a wide area MBS SFN area). The MBS SFN area may be an intra-CU, inter-DU MBS SFN area (for example, associated with a single CU (the CU 705) and multiple DUs (including the DU 710)). In some other aspects, the MBS SFN area may be an inter-CU, inter-DU MBS SFN area (for example, associated with multiple CUs (including the CU 705) and multiple DUs (including the DU 710)). The F1 setup procedure may be triggered by the DU 710. For example, in a first operation 715, the DU 710 may transmit, and the CU 705 may receive, an F1 setup request message. The F1 setup request message may be transmitted via the F1 interface. The F1 setup request message may indicate information identifying the DU 710, an indication of one or more cells served by the DU 710, or system information associated with the DU 710. For example, the F1 setup request message may include one or more information elements (IEs). The one or more IEs may include a gNB-DU Name IE, a gNB-DU Served Cells List IE, a gNB-DU System Information IE, a RAN Area Code IE, or a tracking area identifier (TAI) Slice Support List IE, among other examples. Information to be included in the one or more IEs may be defined, or otherwise fixed, by a wireless communication standard, such as the 3GPP.

In a second operation 720, the CU 705 may transmit, and the DU 710 may receive, an F1 setup response message. For example, the CU 705 may transmit the F1 setup response message based at least in part on (for example, in response to) receiving the F1 setup request message. The F1 setup response message may indicate a list of cells (for example, associated with the DU 710) to be activated (for example, in a Cells to be Activated List IE). The F1 setup response message may indicate configuration information for the list of cells. The DU 710 may activate cells included in the list of cells. For example, the DU 710 may reconfigure a physical cell identity (PCI) for cells for which a PCI IE is included in the F1 setup response message.

Additionally, the F1 setup response message (for example, an F1 application protocol message) may indicate a configuration for an MBS SFN area associated with the CU 705. The configuration may indicate configuration information for one or more MBS channels or multicast channels. For example, each cell associated with the DU 710 may be associated with N MBS SFN areas (for example, one or more MBS SFN areas). In other words, the DU 710 may be associated with one or more MBS SFN areas. The configuration information for an MBS SFN area may indicate channels associated with the MBS SFN area. For example, each MBS SFN area may be associated with one or more MCCHs. In some aspects, each MBS SFN area may be associated with a single MCCH (for example, for transmitting control information associated with the MBS SFN area). Each MBS SFN area may be associated with M PDSCHs (for example, one or more PDSCHs). In some aspects, the configuration information for an MBS SFN area may indicate whether the MBS SFN area is controlled by a single CU (for example, for an intra-CU MBS SFN area) or multiple CUs (for example, for an inter-CU MBS SFN area). For example, the configuration information for an MBS SFN area may indicate one or more CUs that are associated with the MBS SFN area. In inter-CU MBS SFN areas, a single CU may be a control entity for the entire MBS SFN area (for example, a control entity may be defined for MBS SFN areas that are associated with multiple CUs). The configuration information for an inter-CU MBS SFN area may identify the control entity (for example, a CU or another dedicated entity).

The F1 setup response message may include the MBS SFN configuration information. For example, the F1 setup response message may include MCCH configuration information. The MCCH configuration information may enable the DU 710 to configure the MCCH. This may enable the DU 710 to transmit control information for the MBS SFN area to one or more UEs 120 via the MCCH. The F1 setup response message may include an MCH (for example, a transport channel) configuration for each MBS SFN area. The MCH configuration may indicate resources or an MCS associated with SFN communications. For example, the resources may include time domain resources (for example, slots), frequency domain resources (for example, resource elements, resource blocks, or subchannels), or spatial domain resources (for example, beams), among other examples, that are associated with (for example, reserved for) SFN communications. Configuring the resources available for MBS SFN communications in the MBS SFN area may ensure that multiple DUs associated with the MBS SFN area all use the same set of resources for MBS SFN communications. Configuring the MCS for the MCH may ensure that all DUs associated with the MBS SFN area transmit SFN communications using the same MCS. For example, if different DUs were to transmit SFN communications in the same MBS SFN area using different MCSs, then the SFN communications may cause interference. By ensuring that all DUs in the MBS SFN area use the same MCS, a likelihood of interference may be reduced.

The MCH configuration may indicate a logical channel to transport channel mapping for MBS channels. For example, the MCH configuration may indicate an MCCH or MTCH (for example, logical channels) to MCH (for example, transport channel) mapping. In some aspects, the MCCH or MTCH may be mapped to a DL-SCH (for example, a downlink transport channel that is associated with both SFN communications and unicast communications). The mapping of the MCCH or MTCH to the DL-SCH is depicted and described in more detail in connection with FIG. 9. The DL-SCH may be mapped to a PDSCH that is associated with both SFN communications and unicast communications. In such examples, the MCH configuration may indicate a resource partition for the PDSCH. The resource partition indicates sets of resources associated with different multicast channels or different transmission types. For example, the resource partition may indicate a first set of resources (for example, of the PDSCH) associated with a first MCH and a second set of resources associated with a second MCH (for example, of the PDSCH). As another example, the resource partition may indicate a first set of resources (for example, of the PDSCH) associated with SFN communications and a second set of resources associated with unicast communications (for example, of the PDSCH). The resources may be time domain resources, frequency domain resources, or spatial domain resources, among other examples. For example, the sets of resources may be associated with different time domain resources, different frequency domain resources, or different beams, among other examples.

In some other aspects, the MCH configuration may indicate that the MCCH or MTCH is mapped to an MCH DL-SCH (for example, a multicast channel downlink shared transport channel that is mapped to a PDSCH that is associated with only MBS SFN communications). In other words, the MCCH or MTCH for an MBS SFN area may be mapped to an MCH DL-SCH (for example, a transport channel) that is mapped to a PDSCH that is associated with only MBS SFN communications (for example, and not unicast communications). For example, the MCCH or the MTCH may be mapped to a separate transport channel (for example, a transport channel that is separate from a transport channel associated with unicast communications). The mapping of the MCCH or MTCH to the MCH DL-SCH is depicted and described in more detail in connection with FIG. 10.

The configuration information, included in the F1 setup response message, may be updated via a configuration update procedure associated with the F1 interface. For example, the CU 705 may transmit, and the DU 710 may receive, updated configuration information for an MBS SFN area or an MCCH via a configuration update message (for example, a gNB-DU Configuration Update message as defined, or otherwise fixed, by a wireless communication standard, such as the 3GPP). The CU 705 and the DU 710 may perform the configuration update procedure, to update configuration information for an MBS SFN area or an MCCH, as defined, or otherwise fixed, by a wireless communication standard, such as the 3GPP.

In a third operation 725, the DU 710 may transmit, and the UE 120 may receive, an MBS SFN configuration. For example, the DU 710 may transmit, to the UE 120, a configuration for an MBS SFN area. The configuration of the MBS SFN area may be based at least in part on the configuration received by the DU 710 (for example, from the CU 705 in the F1 setup response message). In some aspects, the DU 710 may transmit the MBS SFN configuration via the MCCH. In some aspects, the DU 710 may transmit the MBS SFN configuration via system information (for example, via a system information block (SIB)) or an RRC configuration. In some aspects, the MBS SFN configuration may be indicated by an SIB and RRC configuration information (for example, the MBS SFN area may be partially configured via system information with remaining information for the MBS SFN configured via RRC configuration information).

For example, configuration information for the MCCH may be included in system information transmitted by the DU 710 (for example, in an SIB). The SIB may be an NR SIB. The SIB may indicate configuration information for an MCCH of one or more MBS SFN areas. The SIB may indicate (for example, for an MCCH or an MBS SFN area) an identifier associated with the MBS SFN area (for example, an mbsfn-AreaID IE). Additionally or alternatively, the SIB may indicate a quantity of symbols in a slot or subframe that are not associated with MBS SFN communications. For example, a slot may be associated with one or more symbols that are associated with MBS SFN communications and one or more symbols that are not associated with MBS SFN communications (for example, that are associated with unicast communications). The SIB may indicate that quantity of symbols in a slot or subframe that are associated with unicast communications and not MBS SFN communications (for example, in a non-MBSFNregionLength IE). Additionally or alternatively, the SIB may indicate an MCCH resource and cycle configuration. For example, the SIB may indicate resources (for example, time domain resources, frequency domain resources, or spatial domain resources) associated with the MCCH. Additionally, the SIB may indicate a cycle (for example, a discontinuous reception (DRX) cycle) associated with the MCCH.

Additionally or alternatively, the SIB may indicate an MCCH change notification configuration. For example, the UE 120 may not continually receive or monitor the MCCH (for example, to conserve power). The UE 120 may monitor the MCCH based at least in part on receiving a notification (for example, a change notification) from the DU 710. The SIB may configure a cycle for the transmission of the change notifications. The cycle may be a paging cycle or a DRX cycle. For example, one or more time-frequency resource occasions, in which change notification may be transmitted, may be configured by the SIB. The cycle may indicate a length associated with MCCH modification periods of the MCCH cycle. Each MCCH modification period may be associated with one or more time-frequency resource occasions in which the SIB may be transmitted. The information included in the SIB may be the same for each time-frequency resource occasion included in the same MCCH modification period. If the UE 120 receives a change notification in a first MCCH modification period, then the UE 120 may monitor the MCCH in a next MCCH modification period in order to receive updated configuration information for the MCCH. Additionally or alternatively, the SIB may indicate an MCS that is to be applied to subframes associated with MCCH scheduling (for example, in a signallingMCS IE). The SIB may enable the UE 120 to configure the MCCH. For example, based at least in part on receiving the SIB, the UE 120 may configure the MCCH for the MBS SFN area (for example, for the wide MBS SFN area).

Additionally or alternatively, configuration information for the MBS SFN area may be included in an RRC configuration. For example, the DU 710 may transmit, and the UE 120 may receive, RRC configuration information for the MBS SFN area. The RRC configuration information may be transmitted via the MCCH (for example, that is configured based at least in part on the SIB). The RRC configuration may be an MBSAreaConfiguration. The RRC configuration may indicate configuration information for one or more MBS SFN areas. For each MBS SFN area, the RRC configuration may indicate identifiers of the one or more MTCHs. For example, the RRC configuration may indicate a list of MTCHs associated with the MCCH (for example, the MCCH that the RRC configuration is transmitted on). Additionally or alternatively, the RRC configuration may indicate a resource allocation for each MTCH of the one or more MTCHs. The resource allocation may indicate a time slot, time domain resources, frequency domain resources, spatial domain resources (for example, one or more beams), or a bandwidth part, among other examples, associated with the MTCH. Additionally or alternatively, the RRC configuration may indicate a multicast channel scheduling period (MSP) for each MTCH of the one or more MTCHs. Additionally or alternatively, the RRC configuration may indicate a DRX cycle or a paging cycle for each MTCH of the one or more MTCHs. The resource allocation, MSP, DRX cycle, or paging cycle associated with an MTCH may be used by the UE 120 for power saving operations. For example, the information (for example, the resource allocation, MSP, DRX cycle, or paging cycle) may enable the UE 120 to periodically monitor the MTCH (for example, rather than continually monitoring the MTCH) to conserve power of the UE 120.

As described elsewhere herein, a change in MCCH configuration or in the RRC configuration may be indicated (for example, notified) to the UE 120 via a change notification message that is carried via a PDCCH addressed to an MBS RNTI (M-RNTI). For example, the DU 710 may transmit, and the UE 120 may receive, a change notification associated with an MBS SFN area via a PDCCH using an M-RNTI. The DU 710 may transmit, and the UE 120 may receive, an updated MCCH configuration for the MBS SFN area based at least in part on receiving the change notification.

In a fourth operation 730, the DU 710 may transmit, and the UE 120 may receive, a PDCCH communication scheduling an MBS SFN data communication associated with an MTCH, of the one or more MTCHs (for example, that are configured via the SIB or the RRC configuration). For example, the MBS SFN data communication may be scheduled via the PDCCH. PDCCH-based scheduling may provide improved flexibility for the DU 710 to schedule MBS SFN data communications (for example, as compared to semi-static scheduling, such as MAC-based scheduling where the scheduling information is included in a header of a MAC protocol data unit (PDU)). The PDCCH communication may indicate a resource allocation for the MBS SFN data communication. The DU 710 may determine the resource allocation based at least in part on resources, associated with a PDSCH, that are available for MBS SFN communications (for example, as indicated in the configuration information received from the CU 705 in the second operation 720).

In some aspects, the PDCCH communication may use a normal cyclic prefix (CP). In some other aspects, the PDCCH communication may use an extended cyclic prefix (ECP). For example, the DU 710 and the UE 120 may communicate using a frame structure. A frame (for example, 10 milliseconds (ms)) may be divided into 10 equally sized subframes (for example, 1 ms). Each subframe may include one or more time slots. Subframes may also include mini-slots, which may include 7, 4, or 2 symbols, among other examples. Each slot may include 14 or 12 symbols, depending on whether the CP is normal or extended. For normal CP (NCP), each slot may include 14 symbols, and for an ECP, each slot may include 12 symbols. The symbols on the downlink may be CP orthogonal frequency division multiplexing (OFDM) (CP-OFDM) symbols. The symbols on the uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The quantity of slots within a subframe is based at least in part on the CP and the numerology. The numerology defines the subcarrier spacing (SCS) and, effectively, the symbol length or duration, which is equal to 1/SCS. The following table provides examples of different numerologies, μ, SCSs, and CP types.

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For an NCP (14 symbols per slot), different numerologies, μ, 0 to 4 allow for 1, 2, 4, 8, and 16 slots, respectively, per subframe. For an ECP, the numerology 2 allows for 4 slots per subframe. Accordingly, for a NCP and numerology μ, there are 14 symbols per slot and $2^\mu$ slots per subframe. The subcarrier spacing may be equal to $2^\mu*15$ kilohertz (kHz) where μ is the numerology 0 to 4. Therefore, the numerology μ=0 has a subcarrier spacing of 15 kHz and the numerology μ=4 has a subcarrier spacing of 240 kHz. The symbol length or duration is inversely related to the subcarrier spacing. Within a set of frames, there may be one or more different bandwidth parts that are frequency division multiplexed. Each bandwidth part may have a particular numerology and CP (normal or extended).

In a fifth operation 735, the UE 120 may determine information associated with the MBS SFN data communication based at least in part on the RNTI of the PDCCH. For example, as described elsewhere herein, in some aspects, the MBS SFN data communication may be transmitted (for example, in the sixth operation 740 described below) via a PDSCH that is associated with both unicast communications and MBS SFN communications. The UE 120 may detect the RNTI associated with the PDCCH communication. For example, the RNTI may be a G-RNTI or cell RNTI (C-RNTI). The UE 120 may detect that the MBS SFN data communication is an SFN communication based at least in part on the PDCCH communication being associated with the G-RNTI. For example, the configuration received by the UE 120 (for example, in the third operation 725) may indicate the G-RNTI. Alternatively, if the PDCCH communication were to schedule a unicast communication, then the PDCCH communication may be associated with a C-RNTI. Therefore, the UE 120 may detect whether the communication scheduled by a PDCCH communication is an SFN communication or a unicast communication based at least in part on the RNTI associated with the PDCCH communication. Additionally, the UE 120 may identify a CP type (for example, NCP or ECP) associated with the MBS SFN data communication. For example, a configuration of the G-RNTI may indicate a CP type associated with the G-RNTI. As another example, the UE 120 may identify a virtual cell identifier associated with the MBS SFN data communication based at least in part on the G-RNTI associated with the PDCCH communication. For example, for SFN communications, a virtual cell identifier (rather than a serving cell identifier) may be used for the SFN communications. For example, a virtual cell identifier may be associated with multiple cells, multiple DUs, or multiple base stations (for example, that all transmit the SFN communication) to enable the UE 120 to decode the SFN communication from multiple sources (for example, because each source uses the same virtual cell identifier). Each MBS SFN area may be associated with a virtual cell identifier (for example, that is used by each transmitter in the MBS SFN area). Each transmitter (for example, each cell, each DU, or each base station that transmits the SFN communication) may be associated with a different, or unique, serving cell identifier that may be used for unicast communications. The configuration of the G-RNTI may indicate a virtual cell identifier that is associated with the G-RNTI. The CP type and the virtual cell identifier may be used by the UE 120 to decode the MBS SFN data communication (for example, in a seventh operation 745 described below).

Figure 9:
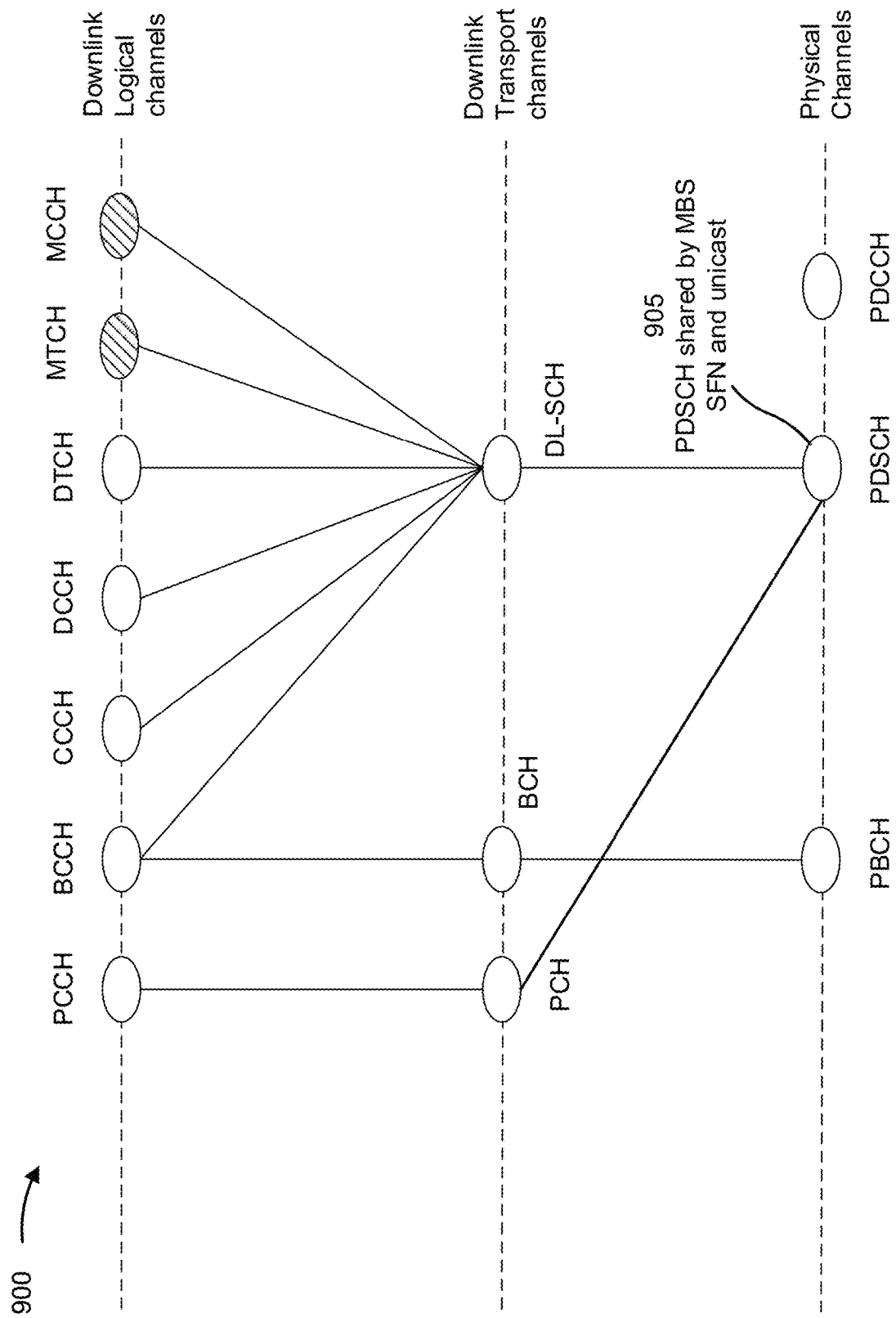
FIG. 9 is a diagram illustrating an example associated with channel mapping for MBS SFN communications, in accordance with the present disclosure.

In a sixth operation 740, the DU 710 may transmit, and the UE 120 may receive, the MBS SFN data communication via a PDSCH that is associated with both SFN communications and unicast communications or that is associated with only MBS SFN communications. For example, the PDSCH may be associated with a transport channel (for example, a DL-SCH) that is associated with both SFN communications and unicast communications (for example, as depicted in FIG. 9). Alternatively, the PDSCH may be associated with a separate transport channel (for example, an MCH DL-SCH) that is associated with only MBS SFN communications (for example, as depicted in FIG. 10).

In some aspects, one or more resources of the PDSCH are reserved for SFN communications (for example, where the PDSCH is associated with both SFN communications and unicast communications). The one or more resources may include time domain resources (for example, one or more slots or one or more symbols), frequency domain resources (for example, one or more resource elements or resource blocks), or spatial domain resources (for example, one or more beams), among other examples. The cell (for example, the DU 710) associated with the MBS SFN data communication may be aware of the one or more resources reserved for SFN communications. The cell (for example, the DU 710) may allocate resources for the MBS SFN data communication based at least in part on the one or more resources reserved for SFN communications. In some aspects, at least one resource, of the one or more resources of the PDSCH that are reserved for SFN communications, may be used by the DU 710 for unicast transmissions based at least in part on no SFN communications being associated with the at least one resource. In other words, SFN resources should be first used by the DU 710 for MBS SFN traffic. Any unused SFN resources may be used by DU 710 for unicast traffic. For example, if MBS SFN data is not scheduled in a given time-frequency resource (for example, in a given slot), then the DU 710 may use the given time-frequency resource for unicast scheduling.

The MBS SFN data communication may be transmitted via a PDSCH that uses an NCP or an ECP. For example, the MBS SFN data communication may be scrambled with a virtual cell identifier (for example, as described above). The virtual cell identifier may be associated with the MBS SFN area in which the MBS SFN data communication is transmitted. The virtual cell identifier may be based at least in part on the NCP or the ECP (for example, in contrast to unicast traffic which may be scrambled with a serving cell identifier, of the DU 710, that is based at least in part on the NCP, and not the ECP). In examples where the PDSCH uses the ECP, the PDCCH communication (for example, transmitted by the DU 710 in the fourth operation 730) may be associated with either the ECP or the NCP (for example, for scheduling an ECP PDSCH). In some aspects, resources (for example, time-frequency resources or spatial domain resources) may be semi-statically configured for a PDSCH that is associated with the ECP. For example, the CU 705 may semi-statically configure or reserve the resources for an ECP PDSCH. The CU 705 may transmit, and the DU 710 may receive, a semi-static configuration or reservation for resources of the PDSCH that are associated with the ECP. In some aspects, the CU 705 may transmit the configuration or the reservation of the resources in the second operation 720. In some other aspects, the CU 705 may transmit the configuration or the reservation of the resources in a different message. The DU 710 may use the resources that are configured or reserved for the ECP PDSCH to transmit (for example, in the sixth operation 740) the MBS SFN data communication via the ECP PDSCH.

A transmission of the MBS SFN data communication via the MCH transport channel (for example, via the DL-SCH or the MCH DL-SCH) may be synchronized among multiple DUs (including the DU 710). For example, the DU 710 may receive, from the CU 705, synchronization timing information for MBS SFN transmissions. For example, the CU 705 may transmit the synchronization timing information in the second operation 720. The MBS SFN data communication may be transmitted (for example, in the sixth operation 740) using a timing that is based at least in part on the synchronization timing information. The synchronization enables various DUs to know the timing to use to transmit the MBS SFN data.

In some aspects, the synchronization timing information may be included in a synchronization (SYNC) PDU. The SYNC PDU may be associated with a synchronization protocol that groups incoming packets into a synchronization sequence. Each packet of the incoming packets may include a timestamp and a packet number. In some aspects, a multicast channel scheduling period associated with the MBS SFN area may be based at least in part on a length of the synchronization sequence.

The data that is sent between the CU 705 and the DUs, including the DU 710, for transmission to the UE 120 as an MBS SFN data transmission, is synchronized. The data is provided from the network to the UE as a PDU, for example, based on the PDCP protocol. In some aspects, the synchronization may be provided by a SYNC protocol at the CU and the DUs. The CU, and each DU, may be synchronized to a same reference time. The SYNC protocol may add a reference time, such as a timestamp that indicates a starting time for the MBS SFN data transmission with respect to a common reference time. For example, if the CU 705 indicates a timestamp of 5 ms to the DUs, the DUs may know that the starting time for the MBS SFN data transmission is T0+5 ms, T0 referring to a common reference time for the DUs and the CU. Therefore, the synchronization protocol enables each DU to know the time at which to transmit the MBS SFN data communication. The SYNC protocol enables each DU and CU to know the common timestamp for a particular packet of the MBS SFN data communication and to attempt to schedule transmission of the packet at the corresponding time. The common timing information (for example, timestamp) from the CU 705 enables synchronization of the transmission across different DUs.

The SYNC protocol may be a peer to peer SYNC protocol per MRB and may be located at the CU 705, in some aspects. The SYNC protocol timing information may be used by multiple DUs to send broadcast data over the air interface in a synchronous manner. A timestamp may represent a relative time value with reference to a start time of the synchronization period, which is common for the DUs and the CU 705. The CU 705 may function as a central scheduling entity for the MBS SFN data communication. For example, a scheduler may determine to transmit a packet of the MBS SFN data transmission at a particular subframe, and the CU 705 may provide the packet to the DUs with a timestamp corresponding to the particular subframe for the packet transmission. The DUs may then schedule the MBS SFN data packet for transmission at the same time (for example, in a same subframe within a same slot) by different cells using the same frequency resources. The UE 120 may receive the MBS SFN data communication as if the transmissions from Cells were coming from a single cell. The combined transmission from multiple cells in an SFN manner may improve reception at the UE 120.

The SYNC protocol groups incoming packets, such as packet 1, packet 2, packet 3, and packet 4, into a synchronization sequence. The synchronization sequence length may be configured, and may be longer than an F1 delay or a delay variation. For example, a SYNC sequence length may be based at least in part on a maximum F1 delay. Each SYNC packet may include control information including, for example, a timestamp and a packet number. The timestamp may be set to the same time in one synchronization sequence. For example, each SYNC PDU may add a timestamp and a sequence number (SN). The packet sequence number in a synchronization sequence may start from 0. An MSP may be 1 or L times the synchronization sequence length. In each MSP, each DU 710 may make scheduling decisions based on any combination of incoming data of corresponding synchronization sequences, a CU configured MCH resource, or a CU configured rule. Examples of the CU configured rule include an MTCH/MCCH to MCH mapping, or a priority rule, among other examples. In some aspects, a DRX cycle or a semi-persistent scheduling configuration for the UE 120 may be based at least in part on the MSP. For example, the DU 710 may transmit, and the UE 120 may receive, an indication of a DRX cycle or a semi-persistent scheduling configuration that is based at least in part on the MSP. In some aspects, the DRX cycle or the semi-persistent scheduling cycle may be the same as the MSP.

In some aspects, the SYNC protocol may involve a new packet layer between a PDCP layer and a GTP-U layer. A PDCP PDU may be carried over a SYNC PDU, for example, between the CU 705 and the DUs. The SYNC PDU may be carried over a general packet radio service (GPRS) tunneling protocol (GTP) user plane (GTP-U), such as over the F1 interface.

In some aspects, SYNC protocol IEs may be added in a RAN container of a GTP-U. There may be a GTP-U tunnel between the CU 705 and the DUs. For example, a timestamp IE of the SYNC protocol may be included in downlink user data of an F1 protocol. In some aspects, a new SYNC container may be defined in a GTP-U header to provide the synchronization between the CU and the DUs. The SYNC container may include a frame control part and a frame check sum part of a SYNC PDU. The payload portion of the SYNC PDU may be carried by the GTP-U payload.

In some aspects, the MCH transport channel (for example, the DL-SCH or the MCH DL-SCH) is used for an initial transmission of MBS packets received, by the DU 710, from the CU 705. For example, CU-initiated transmission and retransmissions of MBS packets may be transmitted by the DU 710 via the MCH transport channel. DU-initiated retransmissions of MBS packets may be included in unicast transmissions. This is because not all DUs in an MBS SFN area may be aware of a DU-initiated retransmission. Therefore, the DU 710 may transmit, and the UE 120 may receive, a retransmission of the MBS SFN data communication as a unicast transmission via the PDSCH (for example, the PDSCH used to initially transmit the MBS SFN data communication) or another PDSCH (for example, a PDSCH associated with unicast communications, such as where the MBS SFN data communication was initially transmitted using a PDSCH that is only associated with MBS SFN communications).

In a seventh operation 745, the UE 120 may decode the MBS SFN data communication. For example, the UE 120 may decode the MBS SFN data communication based at least in part on the CP type and the virtual cell identifier indicated by the configuration associated with the G-RNTI of the PDCCH.

Figure 8:
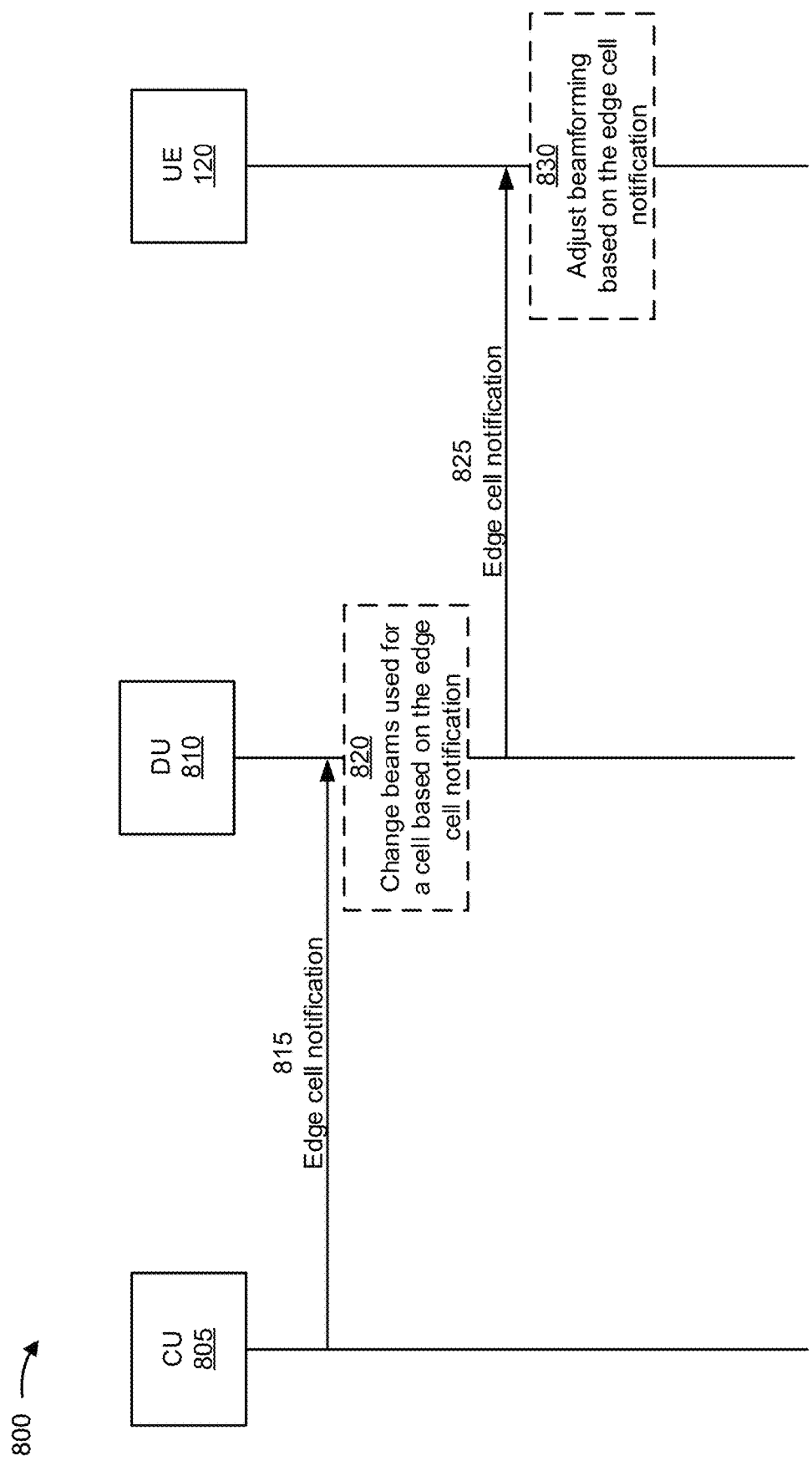
FIG. 8 is a diagram illustrating an example associated with edge cell notifications for MBS SFN communications, in accordance with the present disclosure.

FIG. 8 is a diagram illustrating an example associated with edge cell notifications 800 for MBS SFN communications, in accordance with the present disclosure. As shown in FIG. 8, a CU 805, a DU 810, and a UE 120 may communicate with one another in a wireless network, such as the wireless network 100. The CU 805 may be the CU 705 depicted in FIG. 7. The DU 810 may be the DU 710 depicted in FIG. 7. Similarly, the UE 120 may be the UE 120 depicted in FIG. 7. The CU 805 and the DU 810 may perform operations or functions associated with a base station 110 (for example, functions associated with a base station 110 may be split among the CU 705 and the DU 710 as explained in more detail elsewhere herein). In some aspects, the CU 805 may communicate with multiple DUs 810 (for example, in a similar manner as described herein). Similarly, the DU 810 may communicate with multiple UEs 120 (for example, in a similar manner as described herein). The CU 805 may also be referred to as a gNB-CU and the DU 810 may also be referred to as a gNB-DU.

In a first operation 815, the CU 805 may transmit, and the DU 810 may receive, an edge cell notification indicating that a cell associated with the DU 810 is located proximate to an edge of an MBS SFN area (for example, indicating that the cell is near, or at, an edge of an SFN). An "edge" of an MBS SFN area may refer to a geographic location of the MBS SFN area that is proximate to the end of the MBS SFN area. For example, a cell associated with the DU 810 may be geographically located proximate to the outside or end of the MBS SFN area. In some aspects, the edge cell notification may be included in an F1 setup response message (for example, transmitted by the CU 705 in the second operation 720) or in another message. The edge cell notification may enable the DU 810 to adjust a transmission of MBS SFN data via the cell that is located proximate to the edge of the MBS SFN area.

For example, in a second operation 820, the DU 810 may change or modify the beams used to transmit MBS SFN data communications via the cell indicated by the edge cell notification. For example, the DU 810 may refrain from using one or more beams associated with the cell to transmit the MBS SFN data communication based at least in part on receiving the edge cell notification. The one or more beams may be beams that are spatially directed toward the outside of the MBS SFN area. For example, because the cell is located proximate to the edge of the MBS SFN area, transmissions via the cell may not need to be directed toward all spatial directions. Rather, transmissions via the cell may be reduced to spatial directions (for example, beams) that are toward the center of the MBS SFN area. Adjusting the transmission of MBS SFN data via the cell may enable the DU 810 to conserve resources that would have otherwise been used to transmit MBS SFN data via the cell in a spatial direction that is away from the MBS SFN area.

In a third operation 825, the DU 810 may transmit, and the UE 120 may receive, an edge cell notification indicating that a cell associated with the DU 810 is located proximate to the edge of the MBS SFN area. For example, the DU 810 may transmit an edge cell notification to UEs 120 that are connected to, or geographically located in, cells that have been indicated to the DU 810 (for example, by the CU 805 in the first operation 815) as being located proximate to the edge of the MBS SFN area. In some aspects, the edge cell notification to the UE 120 may be included in an SIB. The SIB may be the same SIB that includes configuration information for the MBS SFN area (for example, transmitted by the DU 710 in the third operation 725) or may be another SIB.

In some aspects, in a fourth operation 830, the UE 120 may adjust beamforming performed by the UE 120 based at least in part on receiving the edge cell notification. For example, the UE 120 may receive MBS SFN data communication (for example, in the sixth operation 740) based at least in part on performing beamforming that is based at least in part on receiving the edge cell notification. The beamforming may include adjusting receive beam(s) used by the UE 120 to receive MBS SFN data. For example, if the UE 120 is not located at the edge of the MBS SFN area, then a wide beam or pseudo-omni beam (for example, that is associated with a wide angular spread) may be sufficient for receiving the MB SFN data because the transmissions may arrive at the UE 120 from all (or multiple) directions. However, at the edge of the MBS SFN area, an angle over which the MBS SFN data arrives at the UE 120 may be reduced. Therefore, the UE 120 may use a receive beam that is directed toward the interior of, or the center of, the MBS SFN area. In other words, the UE 120 may use a narrower beam (rather than a pseudo-omni beam) that is directed toward the MBS SFN area based at least in part on receiving the edge cell notification from the DU 810. This may improve a performance of the reception of the MBS SFN data because the UE 120 is using a beam that is directed in a spatial direction toward an area from which the MBS SFN data communication is more likely to arrive at the UE 120 (for example, rather than using a beam that is at least partially directed in a spatial direction toward the exterior of the MBS SFN area).

FIG. 9 is a diagram illustrating an example associated with channel mapping 900 for MBS SFN communications, in accordance with the present disclosure. As shown in FIG. 9, MBS SFN communications may be transmitted via an MTCH and an MCCH. The MTCH and the MCCH may be logical channels. For example, MBS may use the MTCH and the MCCH in a similar manner as described in more detail elsewhere herein, such as in connection with FIGS. 5-8. The MTCH and the MCCH may be configured by a CU (for example, in a similar manner as described in more detail elsewhere herein, such as in the second operation 720) or by a DU (for example, in a similar manner as described in more detail elsewhere herein, such as in the third operation 725).

As shown in FIG. 9, in some aspects, the MTCH and the MCCH may be mapped to a transport channel that is associated with both SFN communications and unicast communications. For example, the MTCH and the MCCH may be mapped to a DL-SCH. The DL-SCH may be mapped to a PDSCH 905 that is associated with both SFN communications and unicast communications. For example, the PDSCH 905 may be shared by MBS SFN and unicast. In some aspects, resources (for example, time-frequency resources, spatial domain resources, beams, or code domain resources, among other examples) of the PDSCH 905 may be split among MBS SFN and unicast. For example, a first set of resources of the PDSCH 905 may be associated with MBS SFN and a second set of resources of the PDSCH 905 may be associated with unicast. In other words, a set of resources of the PDSCH 905 may be reserved for SFN communications. The resource partition (for example, among MBS SFN and unicast) may be configured by a CU, as described in more detail elsewhere herein.

FIG. 10 is a diagram illustrating an example associated with channel mapping 1000 for MBS SFN communications, in accordance with the present disclosure. As shown in FIG. 10, MBS SFN communications may be transmitted via an MTCH and an MCCH. For example, MBS may use the MTCH and the MCCH in a similar manner as described in more detail elsewhere herein, such as in connection with FIGS. 5-8. The MTCH and the MCCH may be configured by a CU (for example, in a similar manner as described in more detail elsewhere herein, such as in the second operation 720) or by a DU (for example, in a similar manner as described in more detail elsewhere herein, such as in the third operation 725).

As shown in FIG. 10, in some aspects, the MTCH and the MCCH may be mapped to a transport channel that is associated with only MBS SFN communications. For example, the transport channel may be separate from the DL-SCH (for example, that is used for unicast transmissions). The transport channel may be an MCH DL-SCH. The transport channel (for example, the MCH DL-SCH) may be mapped to a PDSCH that is associated with only MBS SFN communications (for example, and not unicast communications). For example, the PDSCH may be an MBS SFN PDSCH. A DU or a base station may use the MBS SFN PDSCH to transmit MBS SFN data. The DU or the base station may use another PDSCH to transmit unicast data.

FIG. 11 is a flowchart illustrating an example process 1100 performed, for example, by a UE, associated with signaling for MBS SFN communication, in accordance with the present disclosure. Example process 1100 is an example where the UE (for example, UE 120) performs operations associated with signaling for MBS SFN communications.

As shown in FIG. 11, in some aspects, process 1100 may include receiving a configuration, for an MBS SFN area, indicating configuration information for one or more multicast traffic channels (block 1110). For example, the UE (such as by using communication manager 140 or reception component 1402, depicted in FIG. 14) may receive a configuration, for an MBS SFN area, indicating configuration information for one or more multicast traffic channels, as described above.

As further shown in FIG. 11, in some aspects, process 1100 may include receiving, in accordance with the configuration, a PDCCH communication scheduling an MBS SFN data communication associated with a multicast traffic channel, of the one or more multicast traffic channels (block 1120). For example, the UE (such as by using communication manager 140 or reception component 1402, depicted in FIG. 14) may receive, in accordance with the configuration, a PDCCH communication scheduling an MBS SFN data communication associated with a multicast traffic channel, of the one or more multicast traffic channels, as described above.

As further shown in FIG. 11, in some aspects, process 1100 may include receiving the MBS SFN data communication via a PDSCH that is associated with both SFN communications and unicast communications or that is associated with only MBS SFN communications (block 1130). For example, the UE (such as by using communication manager 140 or reception component 1402, depicted in FIG. 14) may receive the MBS SFN data communication via a PDSCH that is associated with both SFN communications and unicast communications or that is associated with only MBS SFN communications, as described above.

Process 1100 may include additional aspects, such as any single aspect or any combination of aspects described below or in connection with one or more other processes described elsewhere herein.

In a first additional aspect, the multicast traffic channel and a multicast control channel that is associated with the MBS SFN data communication are mapped to a downlink shared transport channel that is mapped to the PDSCH that is associated with both SFN communications and unicast communications.

In a second additional aspect, alone or in combination with the first aspect, one or more resources of the PDSCH are reserved for SFN communications.

In a third additional aspect, alone or in combination with one or more of the first and second aspects, the one or more resources include at least one of one or more slots, one or more symbols, one or more resource elements, or one or more beams.

In a fourth additional aspect, alone or in combination with one or more of the first through third aspects, the MBS SFN data communication is scrambled with a virtual cell identifier associated with the MBS SFN area.

In a fifth additional aspect, alone or in combination with one or more of the first through fourth aspects, the virtual cell identifier is based at least in part on an ECP or an NCP.

In a sixth additional aspect, alone or in combination with one or more of the first through fifth aspects, the configuration indicates a configuration associated with a G-RNTI, the PDCCH communication is associated with the G-RNTI, and receiving the MBS SFN data communication includes detecting that the MBS SFN data communication is an SFN communication based at least in part on the PDCCH communication being associated with the G-RNTI, and decoding the MBS SFN data communication based at least in part on a cyclic prefix type and a virtual cell identifier indicated by the configuration associated with the G-RNTI.

In a seventh additional aspect, alone or in combination with one or more of the first through sixth aspects, the multicast traffic channel and a multicast control channel that is associated with the MBS SFN data communication are mapped to a multicast channel downlink shared transport channel that is mapped to the PDSCH that is associated with only MBS SFN communications.

In an eighth additional aspect, alone or in combination with one or more of the first through seventh aspects, the PDSCH is associated with an ECP, and the PDCCH communication is associated with the ECP or an NCP.

In a ninth additional aspect, alone or in combination with one or more of the first through eighth aspects, the configuration information includes at least one of a resource allocation for the one or more multicast traffic channels or a multicast channel scheduling period for the one or more multicast traffic channels.

In a tenth additional aspect, alone or in combination with one or more of the first through ninth aspects, the configuration is included in an SIB, and the SIB indicates at least one of an identifier associated with the MBS SFN area, a quantity of symbols in a slot that are not associated with MBS SFN communications, an MCCH resource and cycle configuration, an MCCH change notification configuration, or an MCS that is to be applied to subframes associated with MCCH scheduling.

In an eleventh additional aspect, alone or in combination with one or more of the first through tenth aspects, the configuration is included in an RRC configuration, and the RRC configuration indicates at least one of identifiers of the one or more multicast traffic channels, a resource allocation for each multicast traffic channel of the one or more multicast traffic channels, a multicast channel scheduling period for each multicast traffic channel of the one or more multicast traffic channels, or a DRX cycle for each multicast traffic channel of the one or more multicast traffic channels.

In a twelfth additional aspect, alone or in combination with one or more of the first through eleventh aspects, process 1100 includes receiving, via the PDCCH using an M-RNTI, a change notification associated with the MBS SFN area, and receiving an updated configuration for the MBS SFN area based at least in part on receiving the change notification.

In a thirteenth additional aspect, alone or in combination with one or more of the first through twelfth aspects, process 1100 includes receiving, from a base station, an edge cell notification indicating that a cell associated with the base station is located proximate to an edge of the MBS SFN area.

In a fourteenth additional aspect, alone or in combination with one or more of the first through thirteenth aspects, the edge cell notification is included in an SIB.

In a fifteenth additional aspect, alone or in combination with one or more of the first through fourteenth aspects, receiving the MBS SFN data communication includes receiving the MBS SFN data communication based at least in part on performing beamforming that is based at least in part on receiving the edge cell notification.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

FIG. 12 is a flowchart illustrating an example process 1200 performed, for example, by a DU, associated with signaling for MBS SFN communication, in accordance with the present disclosure. Example process 1200 is an example where the DU (for example, the DU 160, the DU 710, or the DU 810) performs operations associated with signaling for MBS SFN communications.

As shown in FIG. 12, in some aspects, process 1200 may include receiving, from a CU, a configuration for an MBS SFN area associated with the CU, the configuration indicating configuration information for one or more multicast channels (block 1210). For example, the DU (such as by using communication manager 170 or reception component 1502, depicted in FIG. 15) may receive, from a CU, a configuration for an MBS SFN area associated with the CU, the configuration indicating configuration information for one or more multicast channels, as described above.

As further shown in FIG. 12, in some aspects, process 1200 may include transmitting, to one or more UEs in accordance with the configuration, a PDCCH communication scheduling an MBS SFN data communication that is associated with a multicast traffic channel (block 1220). For example, the DU (such as by using communication manager 170 or transmission component 1504, depicted in FIG. 15) may transmit, to one or more UEs in accordance with the configuration, a PDCCH communication scheduling an MBS SFN data communication that is associated with a multicast traffic channel, as described above.

As further shown in FIG. 12, in some aspects, process 1200 may include transmitting, to the one or more UEs, the MBS SFN data communication via a PDSCH that is associated with both SFN communications and unicast communications or a PDSCH that is associated with only MBS SFN communications (block 1230). For example, the DU (such as by using communication manager 170 or transmission component 1504, depicted in FIG. 15) may transmit, to the one or more UEs, the MBS SFN data communication via a PDSCH that is associated with both SFN communications and unicast communications or a PDSCH that is associated with only MBS SFN communications, as described above.

Process 1200 may include additional aspects, such as any single aspect or any combination of aspects described below or in connection with one or more other processes described elsewhere herein.

In a first additional aspect, a channel mapping, included in the configuration information, indicates that the multicast traffic channel and a multicast control channel that is associated with the MBS SFN data communication are mapped to a downlink shared transport channel that is mapped to the PDSCH that is associated with both SFN communications and unicast communications.

In a second additional aspect, alone or in combination with the first aspect, the configuration indicates one or more resources of the PDSCH that are reserved for SFN communications.

In a third additional aspect, alone or in combination with one or more of the first and second aspects, the one or more resources include at least one of one or more slots, one or more symbols, one or more resource blocks, or one or more beams.

In a fourth additional aspect, alone or in combination with one or more of the first through third aspects, at least one resource, of the one or more resources of the PDSCH that are reserved for SFN communications, is used by the DU for unicast transmissions based at least in part on no SFN communications being associated with the at least one resource.

In a fifth additional aspect, alone or in combination with one or more of the first through fourth aspects, the MBS SFN data communication is scrambled with a virtual cell identifier associated with the MBS SFN area.

In a sixth additional aspect, alone or in combination with one or more of the first through fifth aspects, the virtual cell identifier is based at least in part on an ECP or an NCP.

In a seventh additional aspect, alone or in combination with one or more of the first through sixth aspects, the multicast traffic channel and a multicast control channel that is associated with the MBS SFN data communication are mapped to a multicast channel downlink shared transport channel that is mapped to the PDSCH that is associated with only MBS SFN communications.

In an eighth additional aspect, alone or in combination with one or more of the first through seventh aspects, the PDSCH is associated with ECP, and the PDCCH communication is associated with the ECP or an NCP.

In a ninth additional aspect, alone or in combination with one or more of the first through eighth aspects, process 1200 includes receiving, from the CU, a semi-static configuration for resources of the PDSCH that are associated with the ECP.

In a tenth additional aspect, alone or in combination with one or more of the first through ninth aspects, the configuration information indicates at least one of a resource allocation for the one or more multicast traffic channels or a channel mapping for the one or more multicast traffic channels.

In an eleventh additional aspect, alone or in combination with one or more of the first through tenth aspects, the configuration is included in an F1 application protocol message.

In a twelfth additional aspect, alone or in combination with one or more of the first through eleventh aspects, the F1 application protocol message is an F1 setup response message.

In a thirteenth additional aspect, alone or in combination with one or more of the first through twelfth aspects, the DU is associated with one or more MBS SFN areas including the MBS SFN area.

In a fourteenth additional aspect, alone or in combination with one or more of the first through thirteenth aspects, the MBS SFN area is associated with an MCCH and one or more PDSCHs including the PDSCH.

In a fifteenth additional aspect, alone or in combination with one or more of the first through fourteenth aspects, the configuration indicates a resource partition for the PDSCH, and the resource partition indicates sets of resources associated with different multicast channels.

In a sixteenth additional aspect, alone or in combination with one or more of the first through fifteenth aspects, the sets of resources are associated with different time domain resources, different frequency domain resources, or different beams.

In a seventeenth additional aspect, alone or in combination with one or more of the first through sixteenth aspects, process 1200 includes transmitting, to the one or more UEs, an MCCH configuration, for the MBS SFN area, indicating a resource allocation and a multicast channel scheduling period for one or more multicast traffic channels.

In an eighteenth additional aspect, alone or in combination with one or more of the first through seventeenth aspects, the MCCH configuration is included in an SIB, and the SIB indicates at least one of an identifier associated with the MBS SFN area, a quantity of symbols in a slot that are not associated with MBS SFN communications, an MCCH resource and cycle configuration, an MCCH change notification configuration, or an MCS that is to be applied to subframes associated with MCCH scheduling.

In a nineteenth additional aspect, alone or in combination with one or more of the first through eighteenth aspects, the MCCH configuration is included in an RRC configuration, and the RRC configuration indicates at least one of identifiers of the one or more multicast traffic channels, a resource allocation for each multicast traffic channel of the one or more multicast traffic channels, a multicast channel scheduling period for each multicast traffic channel of the one or more multicast traffic channels, or a DRX cycle for each multicast traffic channel of the one or more multicast traffic channels.

In a twentieth additional aspect, alone or in combination with one or more of the first through nineteenth aspects, process 1200 includes transmitting, via the PDCCH using an M-RNTI, a change notification associated with the MBS SFN area, and transmitting, to the one or more UEs, an updated MCCH configuration for the MBS SFN area based at least in part on receiving the change notification.

In a twenty-first additional aspect, alone or in combination with one or more of the first through twentieth aspects, process 1200 includes receiving, from the CU, synchronization timing information for MBS SFN transmissions, and the MBS SFN data communication is transmitted using a timing that is based at least in part on the synchronization timing information.

In a twenty-second additional aspect, alone or in combination with one or more of the first through twenty-first aspects, the synchronization timing information is included in a SYNC PDU.

In a twenty-third additional aspect, alone or in combination with one or more of the first through twenty-second aspects, the SYNC PDU is associated with a synchronization protocol that groups incoming packets into a synchronization sequence, and each packet of the incoming packets includes a timestamp and a packet number.

In a twenty-fourth additional aspect, alone or in combination with one or more of the first through twenty-third aspects, a multicast channel scheduling period associated with the MBS SFN area is based at least in part on a length of the synchronization sequence.

In a twenty-fifth additional aspect, alone or in combination with one or more of the first through twenty-fourth aspects, the synchronization timing information indicates a multicast channel scheduling period, and process 1200 includes transmitting, to the one or more UEs, an indication of a DRX cycle or a semi-persistent scheduling configuration that is based at least in part on the multicast channel scheduling period.

In a twenty-sixth additional aspect, alone or in combination with one or more of the first through twenty-fifth aspects, process 1200 includes transmitting a retransmission of the MBS SFN data communication as a unicast transmission via the PDSCH or another PDSCH.

In a twenty-seventh additional aspect, alone or in combination with one or more of the first through twenty-sixth aspects, process 1200 includes receiving, from the CU, an edge cell notification indicating that a cell associated with the DU is located proximate to an edge of the MBS SFN area.

In a twenty-eighth additional aspect, alone or in combination with one or more of the first through twenty-seventh aspects, transmitting the MBS SFN data communication includes refraining from using one or more beams, associated with the cell, to transmit the MBS SFN data communication based at least in part on receiving the edge cell notification.

In a twenty-ninth additional aspect, alone or in combination with one or more of the first through twenty-eighth aspects, process 1200 includes transmitting, to the one or more UEs, an edge cell notification indicating that the cell associated with the DU is located proximate to the edge of the MBS SFN area.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
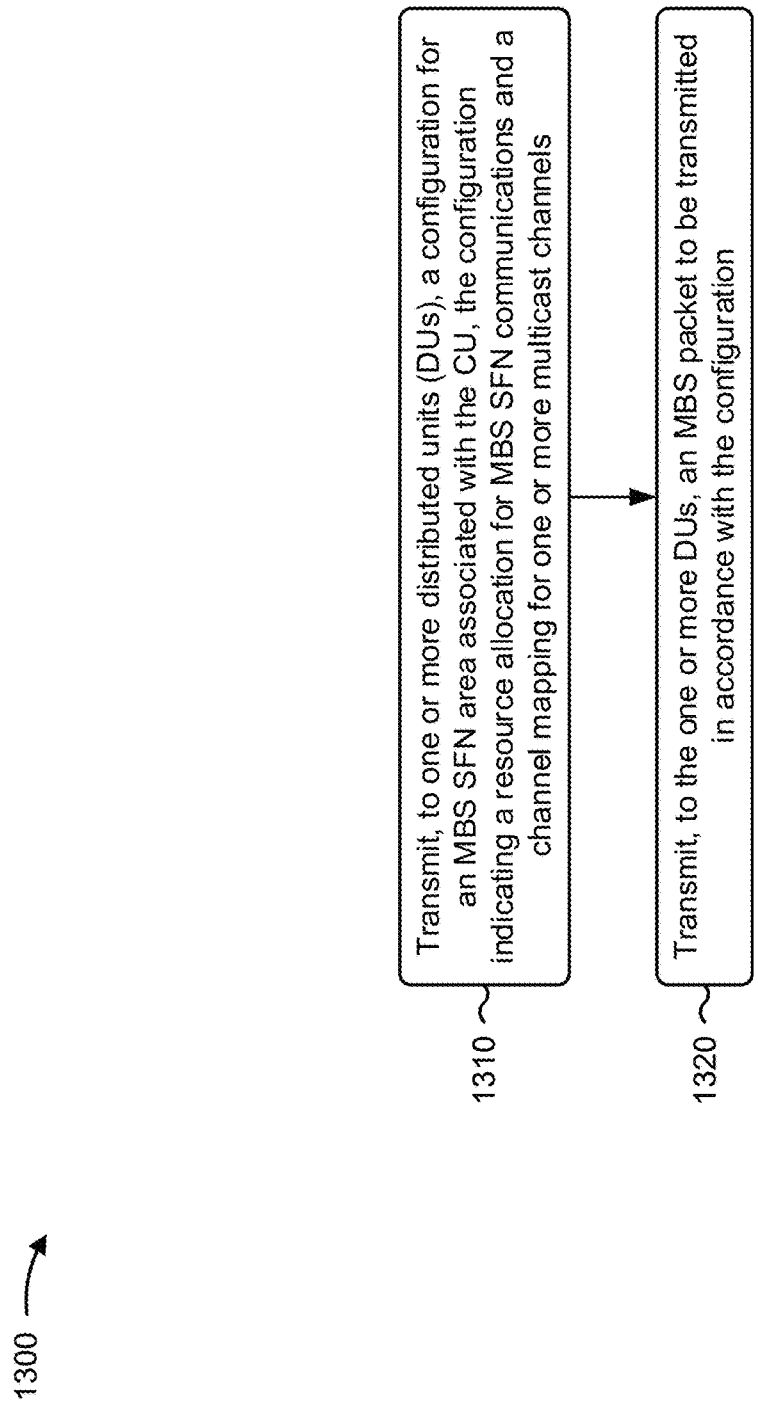
FIG. 13 is a flowchart illustrating an example process performed, for example, by a central unit (CU), associated with signaling for MBS SFN communications, in accordance with the present disclosure.

FIG. 13 is a flowchart illustrating an example process 1300 performed, for example, by a CU, associated with signaling for MBS SFN communication, in accordance with the present disclosure. Example process 1300 is an example where the CU (for example, the CU 150, the CU 705, or the CU 805) performs operations associated with signaling for MBS SFN communications.

As shown in FIG. 13, in some aspects, process 1300 may include transmitting, to one or more DUs, a configuration for an MBS SFN area associated with the CU, the configuration indicating a resource allocation for MBS SFN communications and a channel mapping for one or more multicast channels (block 1310). For example, the CU (such as by using communication manager 180 or transmission component 1604, depicted in FIG. 16) may transmit, to one or more DUs, a configuration for an MBS SFN area associated with the CU, the configuration indicating a resource allocation for MBS SFN communications and a channel mapping for one or more multicast channels, as described above.

As further shown in FIG. 13, in some aspects, process 1300 may include transmitting, to the one or more DUs, an MBS packet to be transmitted in accordance with the configuration (block 1320). For example, the CU (such as by using communication manager 180 or transmission component 1604, depicted in FIG. 16) may transmit, to the one or more DUs, an MBS packet to be transmitted in accordance with the configuration, as described above.

Process 1300 may include additional aspects, such as any single aspect or any combination of aspects described below or in connection with one or more other processes described elsewhere herein.

In a first additional aspect, the configuration is included in an F1 application protocol message.

In a second additional aspect, alone or in combination with the first aspect, the F1 application protocol message is an F1 setup response message.

In a third additional aspect, alone or in combination with one or more of the first and second aspects, the MBS SFN area is associated with an MCCH and one or more PDSCHs.

In a fourth additional aspect, alone or in combination with one or more of the first through third aspects, the configuration indicates a resource partition for a PDSCH, and the resource partition indicates sets of resources associated with different multicast channels.

In a fifth additional aspect, alone or in combination with one or more of the first through fourth aspects, the sets of resources are associated with different time domain resources, different frequency domain resources, or different beams.

In a sixth additional aspect, alone or in combination with one or more of the first through fifth aspects, process 1300 includes transmitting, to the one or more DUs, synchronization timing information for MBS SFN transmissions, and the MBS packet is to be transmitted using a timing that is based at least in part on the synchronization timing information.

In a seventh additional aspect, alone or in combination with one or more of the first through sixth aspects, the synchronization timing information is included in a SYNC PDU.

In an eighth additional aspect, alone or in combination with one or more of the first through seventh aspects, the SYNC PDU is associated with a synchronization protocol that groups incoming packets into a synchronization sequence, and each packet includes a timestamp and a packet number.

In a ninth additional aspect, alone or in combination with one or more of the first through eighth aspects, a multicast channel scheduling period associated with the MBS SFN area is based at least in part on a length of the synchronization sequence.

In a tenth additional aspect, alone or in combination with one or more of the first through ninth aspects, the synchronization timing information indicates a multicast channel scheduling period, and a discontinuous reception (DRX) cycle or a semi-persistent scheduling configuration associated with the one or more DUs is based at least in part on the multicast channel scheduling period.

In an eleventh additional aspect, alone or in combination with one or more of the first through tenth aspects, process 1300 includes transmitting, to a DU of the one or more DUs, an edge cell notification indicating that a cell associated with the DU is located proximate to an edge of the MBS SFN area.

Although FIG. 13 shows example blocks of process 1300, in some aspects, process 1300 may include additional blocks, fewer blocks, different blocks, or differently arranged blocks than those depicted in FIG. 13. Additionally or alternatively, two or more of the blocks of process 1300 may be performed in parallel.

Figure 14:
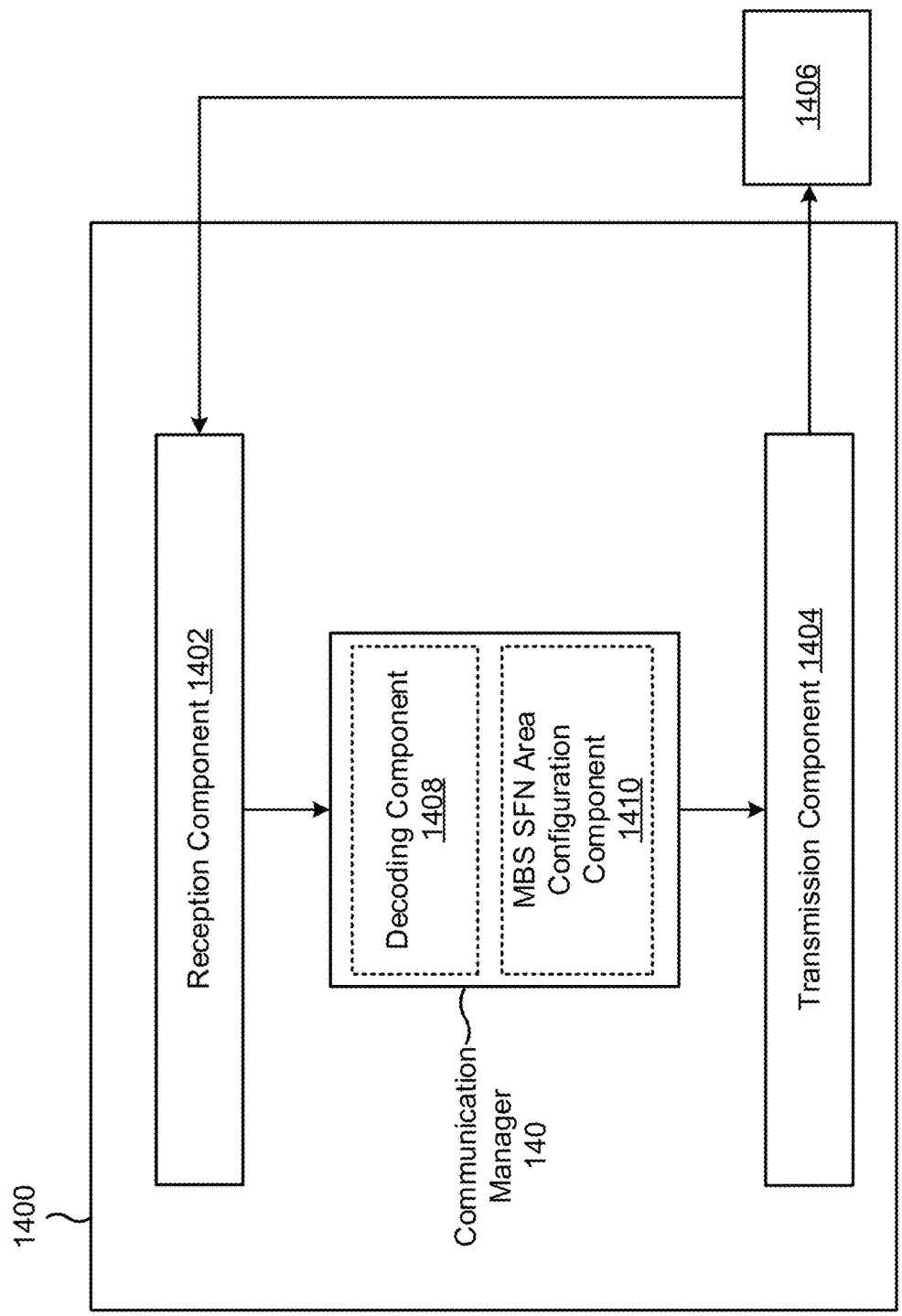
FIGS. 14-16 are diagrams of example apparatuses for wireless communication associated with signaling for MBS SFN communications, in accordance with the present disclosure.

FIG. 14 is a diagram of an example apparatus 1400 for wireless communication in accordance with the present disclosure. The apparatus 1400 may be a UE, or a UE may include the apparatus 1400. In some aspects, the apparatus 1400 includes a reception component 1402, a transmission component 1404, and a communication manager 140, which may be in communication with one another (for example, via one or more buses). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 7-10. Additionally or alternatively, the apparatus 1400 may be configured to perform one or more processes described herein, such as process 1100 of FIG. 11, or a combination thereof. In some aspects, the apparatus 1400 may include one or more components of the UE described above in connection with FIG. 2.

The reception component 1402 may receive communications, such as reference signals, control information, data communications, or a combination thereof, from the apparatus 1406. The reception component 1402 may provide received communications to one or more other components of the apparatus 1400, such as the communication manager 140. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, a modem, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, the communication manager 140 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The communication manager 140 may receive or may cause the reception component 1402 to receive a configuration, for an MBS SFN area, indicating configuration information for one or more multicast traffic channels. The communication manager 140 may receive or may cause the reception component 1402 to receive, in accordance with the configuration, a PDCCH communication scheduling an MBS SFN data communication associated with a multicast traffic channel, of the one or more multicast traffic channels. The communication manager 140 may receive or may cause the reception component 1402 to receive the MBS SFN data communication via a PDSCH that is associated with both SFN communications and unicast communications or that is associated with only MBS SFN communications. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a decoding component 1408, an MBA SFN area configuration component 1410, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive a configuration, for an MBS SFN area, indicating configuration information for one or more multicast traffic channels. The reception component 1402 may receive, in accordance with the configuration, a PDCCH communication scheduling an MBS SFN data communication associated with a multicast traffic channel, of the one or more multicast traffic channels. The reception component 1402 may receive the MBS SFN data communication via a PDSCH that is associated with both SFN communications and unicast communications or that is associated with only MBS SFN communications.

The decoding component 1408 may detect that the MBS SFN data communication is an SFN communication based at least in part on the PDCCH communication being associated with a G-RNTI. The decoding component 1408 may decode the MBS SFN data communication based at least in part on a cyclic prefix type and a virtual cell identifier indicated by the configuration associated with the G-RNTI.

The MBS SFN area configuration component 1410 may configure an MCCH and one or more MTCHs based at least in part on the configuration information.

The reception component 1402 may receive, via the PDCCH using an M-RNTI, a change notification associated with the MBS SFN area.

The reception component 1402 may receive an updated configuration for the MBS SFN area based at least in part on receiving the change notification.

The reception component 1402 may receive, from a base station, an edge cell notification indicating that a cell associated with the base station is located proximate to an edge of the MBS SFN area.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
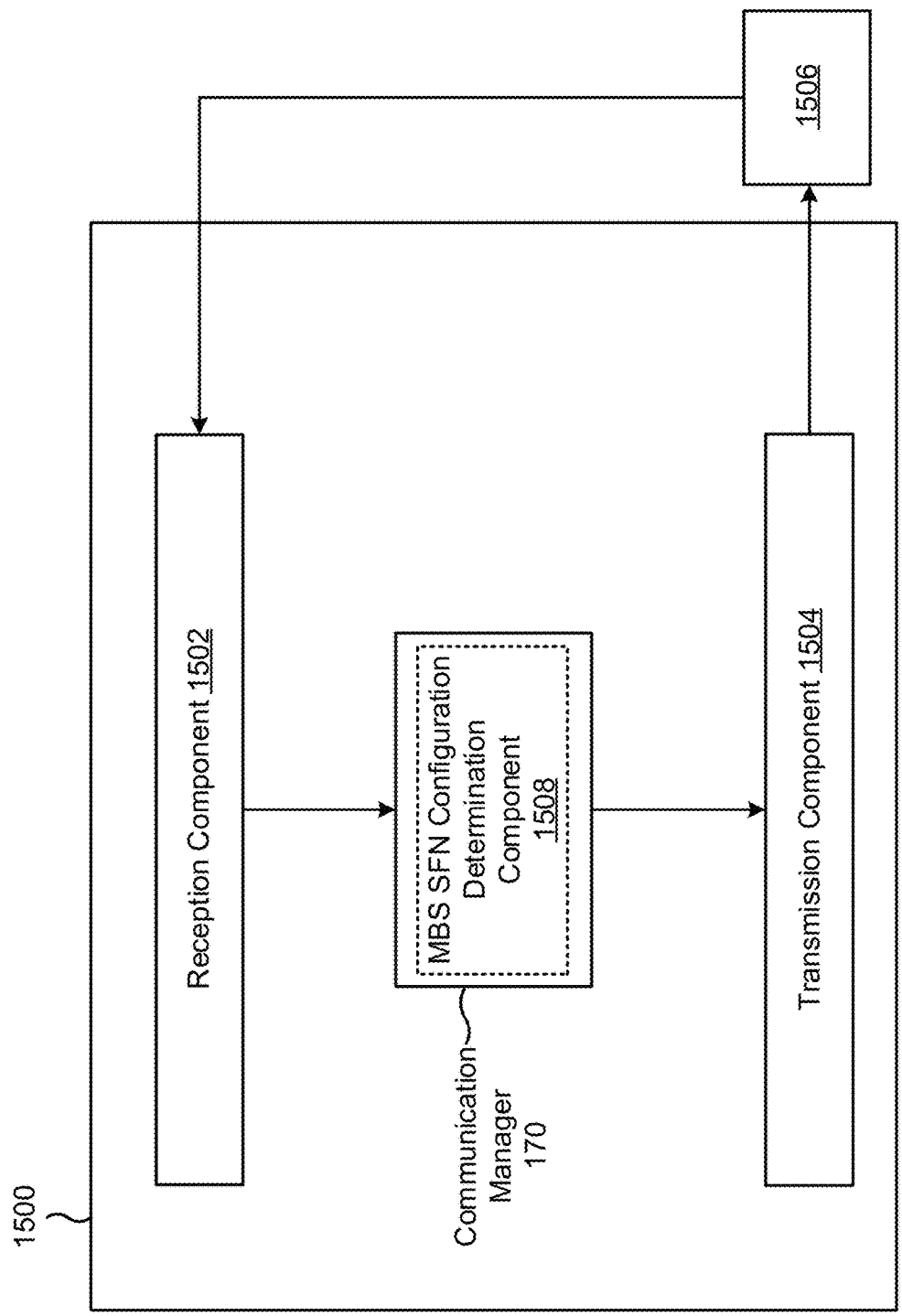

FIG. 15 is a diagram of an example apparatus 1500 for wireless communication in accordance with the present disclosure. The apparatus 1500 may be a DU, or a DU may include the apparatus 1500. In some aspects, the DU may be a base station, or a base station may include the DU. In some aspects, the apparatus 1500 includes a reception component 1502, a transmission component 1504, and a communication manager 170, which may be in communication with one another (for example, via one or more buses). As shown, the apparatus 1500 may communicate with another apparatus 1506 (such as a UE, a base station, or another wireless communication device) using the reception component 1502 and the transmission component 1504.

In some aspects, the apparatus 1500 may be configured to perform one or more operations described herein in connection with FIGS. 7-10. Additionally or alternatively, the apparatus 1500 may be configured to perform one or more processes described herein, such as process 1200 of FIG. 12, or a combination thereof. In some aspects, the apparatus 1500 may include one or more components of the DU described above in connection with FIG. 2.

The reception component 1502 may receive communications, such as reference signals, control information, data communications, or a combination thereof, from the apparatus 1506. The reception component 1502 may provide received communications to one or more other components of the apparatus 1500, such as the communication manager 170. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a modem, a demodulator, a MIMO detector, a receive processor, a controller/processor, a memory, or a combination thereof, of the DU or the base station described above in connection with FIG. 2.

The transmission component 1504 may transmit communications, such as reference signals, control information, data communications, or a combination thereof, to the apparatus 1506. In some aspects, the communication manager 170 may generate communications and may transmit the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the DU or the base station described above in connection with FIG. 2. In some aspects, the transmission component 1504 may be co-located with the reception component 1502 in a transceiver.

The communication manager 170 may receive or may cause the reception component 1502 to receive, from a CU, a configuration for an MBS SFN area associated with the CU, the configuration indicating configuration information for one or more multicast channels. The communication manager 170 may transmit or may cause the transmission component 1504 to transmit, to one or more UEs in accordance with the configuration, a PDCCH communication scheduling an MBS SFN data communication that is associated with a multicast traffic channel. The communication manager 170 may transmit or may cause the transmission component 1504 to transmit, to the one or more UEs, the MBS SFN data communication via a PDSCH that is associated with both SFN communications and unicast communications or a PDSCH that is associated with only MBS SFN communications. In some aspects, the communication manager 170 may perform one or more operations described elsewhere herein as being performed by one or more components of the communication manager 170.

The communication manager 170 may include a controller/processor, a memory, a scheduler, a communication unit, or a combination thereof, of the DU or the base station described above in connection with FIG. 2. In some aspects, the communication manager 170 includes a set of components, such as an MBS SFN configuration determination component 1508, or a combination thereof. Alternatively, the set of components may be separate and distinct from the communication manager 170. In some aspects, one or more components of the set of components may include or may be implemented within a controller/processor, a memory, a scheduler, a communication unit, or a combination thereof, of the DU or the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive, from a CU, a configuration for an MBS SFN area associated with the CU, the configuration indicating configuration information for one or more multicast channels. The transmission component 1504 may transmit, to one or more UEs in accordance with the configuration, a PDCCH communication scheduling an MBS SFN data communication that is associated with a multicast traffic channel. The transmission component 1504 may transmit, to the one or more UEs, the MBS SFN data communication via a PDSCH that is associated with both SFN communications and unicast communications or a PDSCH that is associated with only MBS SFN communications.

The MBS SFN configuration determination component 1508 may determine a configuration for the MBS SFN area based at least in part on the configuration received from the CU. The transmission component 1504 may transmit, to the one or more UEs, the configuration for the MBS SFN area.

The reception component 1502 may receive, from the CU, a semi-static configuration for resources of the PDSCH that are associated with the ECP.

The transmission component 1504 may transmit, to the one or more UEs, an MCCH configuration, for the MBS SFN area, indicating a resource allocation and a multicast channel scheduling period for one or more multicast traffic channels.

The transmission component 1504 may transmit, via the PDCCH using an M-RNTI, a change notification associated with the MBS SFN area.

The transmission component 1504 may transmit, to the one or more UEs, an updated MCCH configuration for the MBS SFN area based at least in part on receiving the change notification.

The reception component 1502 may receive, from the CU, synchronization timing information for MBS SFN transmissions, wherein the MBS SFN data communication is transmitted using a timing that is based at least in part on the synchronization timing information.

The transmission component 1504 may transmit a retransmission of the MBS SFN data communication as a unicast transmission via the PDSCH or another PDSCH.

The reception component 1502 may receive, from the CU, an edge cell notification indicating that a cell associated with the DU is located proximate to an edge of the MBS SFN area.

The transmission component 1504 may transmit, to the one or more UEs, an edge cell notification indicating that the cell associated with the DU is located proximate to the edge of the MBS SFN area.

The quantity and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
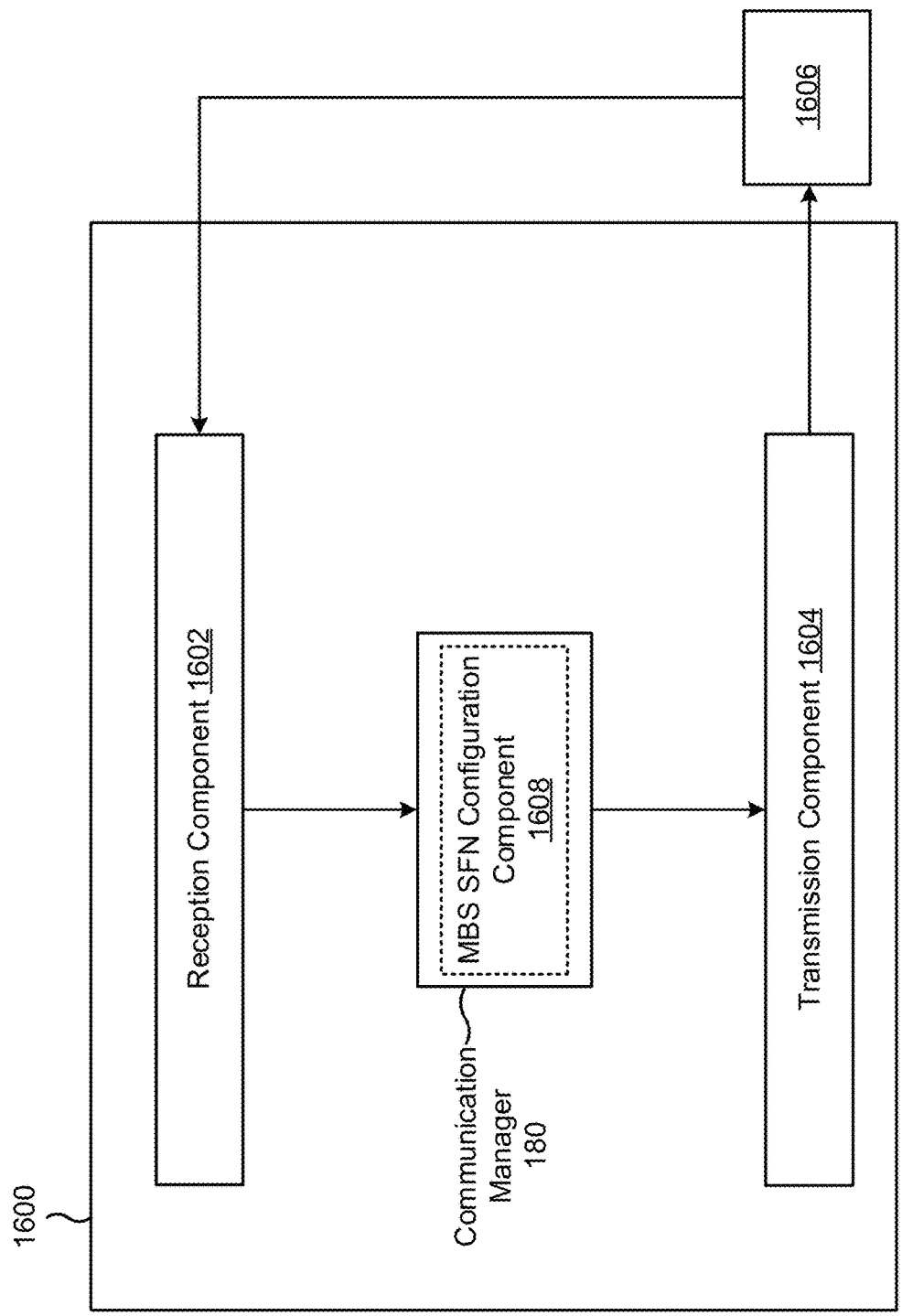

FIG. 16 is a diagram of an example apparatus 1600 for wireless communication in accordance with the present disclosure. The apparatus 1600 may be a CU, or a CU may include the apparatus 1600. In some aspects, the CU may be a base station, or a base station may include the CU. In some aspects, the apparatus 1600 includes a reception component 1602, a transmission component 1604, and a communication manager 180, which may be in communication with one another (for example, via one or more buses). As shown, the apparatus 1600 may communicate with another apparatus 1606 (such as a UE, a base station, or another wireless communication device) using the reception component 1602 and the transmission component 1604.

In some aspects, the apparatus 1600 may be configured to perform one or more operations described herein in connection with FIGS. 7-10. Additionally or alternatively, the apparatus 1600 may be configured to perform one or more processes described herein, such as process 1300 of FIG. 13, or a combination thereof. In some aspects, the apparatus 1600 may include one or more components of the CU or the base station described above in connection with FIG. 2.

The reception component 1602 may receive communications, such as reference signals, control information, data communications, or a combination thereof, from the apparatus 1606. The reception component 1602 may provide received communications to one or more other components of the apparatus 1600, such as the communication manager 180. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a modem, a demodulator, a MIMO detector, a receive processor, a controller/processor, a memory, or a combination thereof, of the CU or the base station described above in connection with FIG. 2.

The transmission component 1604 may transmit communications, such as reference signals, control information, data communications, or a combination thereof, to the apparatus 1606. In some aspects, the communication manager 180 may generate communications and may transmit the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the CU or the base station described above in connection with FIG. 2. In some aspects, the transmission component 1604 may be co-located with the reception component 1602 in a transceiver.

The communication manager 180 may transmit or may cause the transmission component 1604 to transmit, to one or more DUs, a configuration for an MBS SFN area associated with the CU, the configuration indicating a resource allocation for MBS SFN communications and a channel mapping for one or more multicast channels. The communication manager 180 may transmit or may cause the transmission component 1604 to transmit, to the one or more DUs, an MBS packet to be transmitted in accordance with the configuration. In some aspects, the communication manager 180 may perform one or more operations described elsewhere herein as being performed by one or more components of the communication manager 180.

The communication manager 180 may include a controller/processor, a memory, a scheduler, a communication unit, or a combination thereof, of the CU or the base station described above in connection with FIG. 2. In some aspects, the communication manager 180 includes a set of components, such as an MBS SFN configuration component 1608, or a combination thereof. Alternatively, the set of components may be separate and distinct from the communication manager 180. In some aspects, one or more components of the set of components may include or may be implemented within a controller/processor, a memory, a scheduler, a communication unit, or a combination thereof, of the CU or the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1604 may transmit, to one or more DUs, a configuration for an MBS SFN area associated with the apparatus 1600, the configuration indicating a resource allocation for MBS SFN communications and a channel mapping for one or more multicast channels. The transmission component 1604 may transmit, to the one or more DUs, an MBS packet to be transmitted in accordance with the configuration.

The transmission component 1604 may transmit, to the one or more DUs, synchronization timing information for MBS SFN transmissions wherein the MBS packet is to be transmitted using a timing that is based at least in part on the synchronization timing information.

The transmission component 1604 may transmit, to a DU of the one or more DUs, an edge cell notification indicating that a cell associated with the DU is located proximate to an edge of the MBS SFN area.

The MBS SFN configuration component 1608 may determine the configuration for the MBS SFN area. The MBS SFN configuration component 1608 may determine the configuration for the MBS SFN area based at least in part on receiving an F1 setup request message from a DU of the one or more DUs.

The quantity and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: receiving a configuration, for a multicast broadcast service (MBS) single frequency network (SFN) area, indicating configuration information for one or more multicast traffic channels; receiving, in accordance with the configuration, a physical downlink control channel (PDCCH) communication scheduling an MBS SFN data communication associated with a multicast traffic channel, of the one or more multicast traffic channels; and receiving the MBS SFN data communication via a physical downlink shared channel (PDSCH) that is associated with both SFN communications and unicast communications or that is associated with only MBS SFN communications.

Aspect 2: The method of Aspect 1, wherein the multicast traffic channel and a multicast control channel that is associated with the MBS SFN data communication are mapped to a downlink shared transport channel that is mapped to the PDSCH that is associated with both SFN communications and unicast communications.

Aspect 3: The method of any of Aspects 1-2, wherein one or more resources of the PDSCH are reserved for SFN communications.

Aspect 4: The method of Aspect 3, wherein the one or more resources include at least one of: one or more slots, one or more symbols, one or more resource elements, or one or more beams.

Aspect 5: The method of any of Aspects 1-4, wherein the MBS SFN data communication is scrambled with a virtual cell identifier associated with the MBS SFN area.

Aspect 6: The method of Aspect 5, wherein the virtual cell identifier is based at least in part on an extended cyclic prefix (ECP) or a normal cyclic prefix (NCP).

Aspect 7: The method of any of Aspects 1-6, wherein the configuration indicates a configuration associated with a group radio network temporary identifier (G-RNTI), wherein the PDCCH communication is associated with the G-RNTI, and wherein receiving the MBS SFN data communication comprises: detecting that the MBS SFN data communication is an SFN communication based at least in part on the PDCCH communication being associated with the G-RNTI; and decoding the MBS SFN data communication based at least in part on a cyclic prefix type and a virtual cell identifier indicated by the configuration associated with the G-RNTI.

Aspect 8: The method of any of Aspects 1-7, wherein the multicast traffic channel and a multicast control channel that is associated with the MBS SFN data communication are mapped to a multicast channel downlink shared transport channel that is mapped to the PDSCH that is associated with only MBS SFN communications.

Aspect 9: The method of Aspect 8, wherein the PDSCH is associated with an extended cyclic prefix (ECP), and wherein the PDCCH communication is associated with the ECP or a normal cyclic prefix (NCP).

Aspect 10: The method of any of Aspects 1-9, wherein the configuration information includes at least one of a resource allocation for the one or more multicast traffic channels or a multicast channel scheduling period for the one or more multicast traffic channels.

Aspect 11: The method of any of Aspects 1-10, wherein the configuration is included in a system information block (SIB), and wherein the SIB indicates at least one of: an identifier associated with the MBS SFN area; a quantity of symbols in a slot that are not associated with MBS SFN communications; a multicast control channel (MCCH) resource and cycle configuration; an MCCH change notification configuration; or a modulation and coding scheme (MCS) that is to be applied to subframes associated with MCCH scheduling.

Aspect 12: The method of any of Aspects 1-11, wherein the configuration is included in a radio resource control (RRC) configuration, and wherein the RRC configuration indicates at least one of: identifiers of the one or more multicast traffic channels, a resource allocation for each multicast traffic channel of the one or more multicast traffic channels, a multicast channel scheduling period for each multicast traffic channel of the one or more multicast traffic channels, or a discontinuous reception (DRX) cycle for each multicast traffic channel of the one or more multicast traffic channels.

Aspect 13: The method of any of Aspects 1-12, further comprising: receiving, via the PDCCH using a multicast radio network temporary identifier (M-RNTI), a change notification associated with the MBS SFN area; and receiving an updated configuration for the MBS SFN area based at least in part on receiving the change notification.

Aspect 14: The method of any of Aspects 1-13, further comprising receiving, from a base station, an edge cell notification indicating that a cell associated with the base station is located proximate to an edge of the MBS SFN area.

Aspect 15: The method of Aspect 14, wherein the edge cell notification is included in a system information block (SIB).

Aspect 16: The method of any of Aspects 14-15, wherein receiving the MBS SFN data communication comprises receiving the MBS SFN data communication based at least in part on performing beamforming that is based at least in part on receiving the edge cell notification.

Aspect 17: A method of wireless communication performed by a distributed unit (DU), comprising: receiving, from a central unit (CU), a configuration for a multicast broadcast service (MBS) single frequency network (SFN) area associated with the CU, the configuration indicating configuration information for one or more multicast channels; transmitting, to one or more user equipments (UEs) in accordance with the configuration, a physical downlink control channel (PDCCH) communication scheduling an MBS SFN data communication that is associated with a multicast traffic channel; and transmitting, to the one or more UEs, the MBS SFN data communication via a physical downlink shared channel (PDSCH) that is associated with both SFN communications and unicast communications or a PDSCH that is associated with only MBS SFN communications.

Aspect 18: The method of Aspect 17, wherein a channel mapping, included in the configuration information, indicates that the multicast traffic channel and a multicast control channel that is associated with the MBS SFN data communication are mapped to a downlink shared transport channel that is mapped to the PDSCH that is associated with both SFN communications and unicast communications.

Aspect 19: The method of any of Aspects 17-18, wherein the configuration indicates one or more resources of the PDSCH that are reserved for SFN communications.

Aspect 20: The method of Aspect 19, wherein the one or more resources include at least one of: one or more slots, one or more symbols, one or more resource blocks, or one or more beams.

Aspect 21: The method of any of Aspects 19-20, wherein at least one resource, of the one or more resources of the PDSCH that are reserved for SFN communications, is used by the DU for unicast transmissions based at least in part on no SFN communications being associated with the at least one resource.

Aspect 22: The method of any of Aspects 17-21, wherein the MBS SFN data communication is scrambled with a virtual cell identifier associated with the MBS SFN area.

Aspect 23: The method of Aspect 22, wherein the virtual cell identifier is based at least in part on an extended cyclic prefix (ECP) or a normal cyclic prefix (NCP).

Aspect 24: The method of any of Aspects 17-23, wherein the multicast traffic channel and a multicast control channel that is associated with the MBS SFN data communication are mapped to a multicast channel downlink shared transport channel that is mapped to the PDSCH that is associated with only MBS SFN communications.

Aspect 25: The method of Aspect 24, wherein the PDSCH is associated with an extended cyclic prefix (ECP), and wherein the PDCCH communication is associated with the ECP or a normal cyclic prefix (NCP).

Aspect 26: The method of Aspect 25, further comprising receiving, from the CU, a semi-static configuration for resources of the PDSCH that are associated with the ECP.

Aspect 27: The method of any of Aspects 17-26, wherein the configuration information indicates at least one of a resource allocation for the one or more multicast traffic channels or a channel mapping for the one or more multicast traffic channels.

Aspect 28: The method of any of Aspects 17-27, wherein the configuration is included in an F1 application protocol message.

Aspect 29: The method of Aspect 28, wherein the F1 application protocol message is an F1 setup response message.

Aspect 30: The method of any of Aspects 17-29, wherein the DU is associated with one or more MBS SFN areas including the MBS SFN area.

Aspect 31: The method of any of Aspects 17-30, wherein the MBS SFN area is associated with a multicast control channel (MCCH) and one or more PDSCHs including the PDSCH.

Aspect 32: The method of any of Aspects 17-31, wherein the configuration indicates a resource partition for the PDSCH, and wherein the resource partition indicates sets of resources associated with different multicast channels.

Aspect 33: The method of Aspect 32, wherein the sets of resources are associated with different time domain resources, different frequency domain resources, or different beams.

Aspect 34: The method of any of Aspects 17-33, further comprising transmitting, to the one or more UEs, a multicast control channel (MCCH) configuration, for the MBS SFN area, indicating a resource allocation and a multicast channel scheduling period for one or more multicast traffic channels.

Aspect 35: The method of Aspect 34, wherein the MCCH configuration is included in a system information block (SIB), and wherein the SIB indicates at least one of: an identifier associated with the MBS SFN area; a quantity of symbols in a slot that are not associated with MBS SFN communications; a multicast control channel (MCCH) resource and cycle configuration; an MCCH change notification configuration; or a modulation and coding scheme (MCS) that is to be applied to subframes associated with MCCH scheduling.

Aspect 36: The method of any of Aspects 34-35, wherein the MCCH configuration is included in a radio resource control (RRC) configuration, and wherein the RRC configuration indicates at least one of: identifiers of the one or more multicast traffic channels, a resource allocation for each multicast traffic channel of the one or more multicast traffic channels, a multicast channel scheduling period for each multicast traffic channel of the one or more multicast traffic channels, or a discontinuous reception (DRX) cycle for each multicast traffic channel of the one or more multicast traffic channels.

Aspect 37: The method of any of Aspects 34-36, further comprising: transmitting, via the PDCCH using a multicast radio network temporary identifier (M-RNTI), a change notification associated with the MBS SFN area; and transmitting, to the one or more UEs, an updated MCCH configuration for the MBS SFN area based at least in part on receiving the change notification.

Aspect 38: The method of any of Aspects 17-37, further comprising receiving, from the CU, synchronization timing information for MBS SFN transmissions, and wherein the MBS SFN data communication is transmitted using a timing that is based at least in part on the synchronization timing information.

Aspect 39: The method of Aspect 38, wherein the synchronization timing information is included in a synchronization (SYNC) protocol data unit (PDU).

Aspect 40: The method of Aspect 39, wherein the SYNC PDU is associated with a synchronization protocol that groups incoming packets into a synchronization sequence, wherein each packet of the incoming packets includes a timestamp and a packet number.

Aspect 41: The method of Aspect 40, wherein a multicast channel scheduling period associated with the MBS SFN area is based at least in part on a length of the synchronization sequence.

Aspect 42: The method of any of Aspects 38-41, wherein the synchronization timing information indicates a multicast channel scheduling period, the method further comprising transmitting, to the one or more UEs, an indication of a discontinuous reception (DRX) cycle or a semi-persistent scheduling configuration that is based at least in part on the multicast channel scheduling period.

Aspect 43: The method of any of Aspects 17-42, further comprising transmitting a retransmission of the MBS SFN data communication as a unicast transmission via the PDSCH or another PDSCH.

Aspect 44: The method of any of Aspects 17-43, further comprising receiving, from the CU, an edge cell notification indicating that a cell associated with the DU is located proximate to an edge of the MBS SFN area.

Aspect 45: The method of Aspect 44, wherein transmitting the MBS SFN data communication comprises refraining from using one or more beams, associated with the cell, to transmit the MBS SFN data communication based at least in part on receiving the edge cell notification.

Aspect 46: The method of any of Aspects 44-45, further comprising transmitting, to the one or more UEs, an edge cell notification indicating that the cell associated with the DU is located proximate to the edge of the MBS SFN area.

Aspect 47: A method of wireless communication performed by a central unit (CU), comprising: transmitting, to one or more distributed units (DUs), a configuration for a multicast broadcast service (MBS) single frequency network (SFN) area associated with the CU, the configuration indicating a resource allocation for MBS SFN communications and a channel mapping for one or more multicast channels; and transmitting, to the one or more DUs, an MBS packet to be transmitted in accordance with the configuration.

Aspect 48: The method of Aspect 47, wherein the configuration is included in an F1 application protocol message.

Aspect 49: The method of Aspect 48, wherein the F1 application protocol message is an F1 setup response message.

Aspect 50: The method of any of Aspects 47-49, wherein the MBS SFN area is associated with a multicast control channel (MCCH) and one or more physical downlink shared channels (PDSCHs).

Aspect 51: The method of any of Aspects 47-50, wherein the configuration indicates a resource partition for a physical downlink shared channel (PDSCH), and wherein the resource partition indicates sets of resources associated with different multicast channels.

Aspect 52: The method of Aspect 51, wherein the sets of resources are associated with different time domain resources, different frequency domain resources, or different beams.

Aspect 53: The method of any of Aspects 47-52, further comprising transmitting, to the one or more DUs, synchronization timing information for MBS SFN transmissions, and wherein the MBS packet is to be transmitted using a timing that is based at least in part on the synchronization timing information.

Aspect 54: The method of Aspect 53, wherein the synchronization timing information is included in a synchronization (SYNC) protocol data unit (PDU).

Aspect 55: The method of Aspect 54, wherein the SYNC PDU is associated with a synchronization protocol that groups incoming packets into a synchronization sequence, wherein each packet includes a timestamp and a packet number.

Aspect 56: The method of Aspect 55, wherein a multicast channel scheduling period associated with the MBS SFN area is based at least in part on a length of the synchronization sequence.

Aspect 57: The method of any of Aspects 53-56, wherein the synchronization timing information indicates a multicast channel scheduling period, and wherein a discontinuous reception (DRX) cycle or a semi-persistent scheduling configuration associated with the one or more DUs is based at least in part on the multicast channel scheduling period.

Aspect 58: The method of any of Aspects 47-57, further comprising transmitting, to a DU of the one or more DUs, an edge cell notification indicating that a cell associated with the DU is located proximate to an edge of the MBS SFN area.

Aspect 59: An apparatus for wireless communication at a device, comprising a processor; memory coupled with the processor; and instructions stored in the memory and executable by the processor to cause the apparatus to perform the method of one or more of Aspects 1-16.

Aspect 60: A device for wireless communication, comprising a memory and one or more processors coupled to the memory, the one or more processors configured to perform the method of one or more of Aspects 1-16.

Aspect 61: An apparatus for wireless communication, comprising at least one means for performing the method of one or more of Aspects 1-16.

Aspect 62: A non-transitory computer-readable medium storing code for wireless communication, the code comprising instructions executable by a processor to perform the method of one or more of Aspects 1-16.

Aspect 63: A non-transitory computer-readable medium storing a set of instructions for wireless communication, the set of instructions comprising one or more instructions that, when executed by one or more processors of a device, cause the device to perform the method of one or more of Aspects 1-16.

Aspect 64: An apparatus for wireless communication at a device, comprising a processor; memory coupled with the processor; and instructions stored in the memory and executable by the processor to cause the apparatus to perform the method of one or more of Aspects 17-46.

Aspect 65: A device for wireless communication, comprising a memory and one or more processors coupled to the memory, the one or more processors configured to perform the method of one or more of Aspects 17-46.

Aspect 66: An apparatus for wireless communication, comprising at least one means for performing the method of one or more of Aspects 17-46.

Aspect 67: A non-transitory computer-readable medium storing code for wireless communication, the code comprising instructions executable by a processor to perform the method of one or more of Aspects 17-46.

Aspect 68: A non-transitory computer-readable medium storing a set of instructions for wireless communication, the set of instructions comprising one or more instructions that, when executed by one or more processors of a device, cause the device to perform the method of one or more of Aspects 17-46.

Aspect 69: An apparatus for wireless communication at a device, comprising a processor; memory coupled with the processor; and instructions stored in the memory and executable by the processor to cause the apparatus to perform the method of one or more of Aspects 47-58.

Aspect 70: A device for wireless communication, comprising a memory and one or more processors coupled to the memory, the one or more processors configured to perform the method of one or more of Aspects 47-58.

Aspect 71: An apparatus for wireless communication, comprising at least one means for performing the method of one or more of Aspects 47-58.

Aspect 72: A non-transitory computer-readable medium storing code for wireless communication, the code comprising instructions executable by a processor to perform the method of one or more of Aspects 47-58.

Aspect 73: A non-transitory computer-readable medium storing a set of instructions for wireless communication, the set of instructions comprising one or more instructions that, when executed by one or more processors of a device, cause the device to perform the method of one or more of Aspects 47-58.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   at least one processor; and
   at least one memory coupled with the at least one processor and storing processor-readable code that, when executed by the at least one processor, is configured to cause the UE to:
      receive, from a distributed unit, a configuration, for a multicast broadcast service (MBS) single frequency network (SFN) area, indicating configuration information for one or more multicast traffic channels;
      receive, in accordance with the configuration, a physical downlink control channel (PDCCH) communication scheduling an MBS SFN data communication associated with a multicast traffic channel, of the one or more multicast traffic channels; and
      receive the MBS SFN data communication via a physical downlink shared channel (PDSCH) that is associated with both SFN communications and unicast communications or that is associated with only MBS SFN communications.

2. The UE of claim 1, wherein one or more resources of the PDSCH are reserved for SFN communications.

3. The UE of claim 1, wherein the configuration indicates a configuration associated with a group radio network temporary identifier (G-RNTI), wherein the PDCCH communication is associated with the G-RNTI, and wherein the processor-readable code that, when executed by the at least one processor, is configured to cause the UE to receive the MBS SFN data communication, is configured to cause the UE to:
   detect that the MBS SFN data communication is an SFN communication based at least in part on the PDCCH communication being associated with the G-RNTI; and
   decode the MBS SFN data communication based at least in part on a cyclic prefix type and a virtual cell identifier indicated by the configuration associated with the G-RNTI.

4. The UE of claim 1, wherein the multicast traffic channel and a multicast control channel that is associated with the MBS SFN data communication are mapped to a multicast channel downlink shared transport channel that is mapped to the PDSCH that is associated with only MBS SFN communications.

5. The UE of claim 1, wherein the configuration is included in a system information block (SIB), and wherein the SIB indicates at least one of:
   an identifier associated with the MBS SFN area;
   a quantity of symbols in a slot that are not associated with MBS SFN communications;
   a multicast control channel (MCCH) resource and cycle configuration;
   an MCCH change notification configuration; or
   a modulation and coding scheme (MCS) that is to be applied to subframes associated with MCCH scheduling.

6. The UE of claim 1, wherein the configuration is included in a radio resource control (RRC) configuration, and wherein the RRC configuration indicates at least one of:
   identifiers of the one or more multicast traffic channels,
   a resource allocation for each multicast traffic channel of the one or more multicast traffic channels,
   a multicast channel scheduling period for each multicast traffic channel of the one or more multicast traffic channels, or
   a discontinuous reception (DRX) cycle for each multicast traffic channel of the one or more multicast traffic channels.

7. The UE of claim 1, wherein the at least one memory further stores processor-readable code configured to cause the UE to receive, from a base station, an edge cell notification indicating that a cell associated with the base station is located proximate to an edge of the MBS SFN area, and wherein, to cause the UE to receive the MBS SFN data communication, the processor-readable code, when executed by the at least one processor, is configured to cause the UE to:
   receive the MBS SFN data communication based at least in part on performing beamforming that is based at least in part on receiving the edge cell notification.

8. A distributed unit (DU) for wireless communication, comprising:
   at least one processor; and
   at least one memory coupled with the at least one processor and storing processor-readable code that, when executed by the at least one processor, is configured to cause the DU to:
      receive, from a central unit (CU), a configuration for an inter-DU multicast broadcast service (MBS) single frequency network (SFN) area, the configuration indicating configuration information for one or more multicast channels;
      transmit, to one or more user equipments (UEs) in accordance with the configuration, a physical downlink control channel (PDCCH) communication scheduling an MBS SFN data communication that is associated with a multicast traffic channel; and
      transmit, to the one or more UEs, the MBS SFN data communication via a physical downlink shared channel (PDSCH) that is associated with both SFN communications and unicast communications or a PDSCH that is associated with only MBS SFN communications.

9. The DU of claim 8, wherein the configuration indicates one or more resources of the PDSCH that are reserved for SFN communications, and wherein at least one resource, of the one or more resources of the PDSCH that are reserved for SFN communications, is used by the DU for unicast transmissions based at least in part on no SFN communications being associated with the at least one resource.

10. The DU of claim 8, wherein the configuration is included in an F1 application protocol message.

11. The DU of claim 8, wherein the configuration indicates a resource partition for the PDSCH, and wherein the resource partition indicates sets of resources associated with different multicast channels.

12. The DU of claim 8, wherein the at least one memory further stores processor-readable code configured to cause the DU to transmit, to the one or more UEs, a multicast control channel (MCCH) configuration, for the inter-DU MBS SFN area, indicating a resource allocation and a multicast channel scheduling period for one or more multicast traffic channels.

13. The DU of claim 8, wherein the at least one memory further stores processor-readable code configured to cause the DU to receive, from the CU, synchronization timing information for MBS SFN transmissions, and
wherein the MBS SFN data communication is transmitted using a timing that is based at least in part on the synchronization timing information.

14. The DU of claim 8, wherein the at least one memory further stores processor-readable code configured to cause the DU to receive, from the CU, an edge cell notification indicating that a cell associated with the DU is located proximate to an edge of the inter-DU MBS SFN area, and wherein, to cause the DU to transmit the MBS SFN data communication, the processor-readable code, when executed by the at least one processor, is configured to cause the DU to:
refrain from using one or more beams, associated with the cell, to transmit the MBS SFN data communication based at least in part on receiving the edge cell notification.

15. The DU of claim 14, wherein the at least one memory further stores processor-readable code configured to cause the DU to transmit, to the one or more UEs, an edge cell notification indicating that the cell associated with the DU is located proximate to the edge of the inter-DU MBS SFN area.

16. A method of wireless communication performed by a user equipment (UE), comprising:
receiving, from a distributed unit, a configuration, for a multicast broadcast service (MBS) single frequency network (SFN) area, indicating configuration information for one or more multicast traffic channels;
receiving, in accordance with the configuration, a physical downlink control channel (PDCCH) communication scheduling an MBS SFN data communication associated with a multicast traffic channel, of the one or more multicast traffic channels; and
receiving the MBS SFN data communication via a physical downlink shared channel (PDSCH) that is associated with both SFN communications and unicast communications or that is associated with only MBS SFN communications.

17. The method of claim 16, wherein one or more resources of the PDSCH are reserved for SFN communications.

18. The method of claim 16, wherein the configuration indicates a configuration associated with a group radio network temporary identifier (G-RNTI), wherein the PDCCH communication is associated with the G-RNTI, and wherein receiving the MBS SFN data communication comprises:
detecting that the MBS SFN data communication is an SFN communication based at least in part on the PDCCH communication being associated with the G-RNTI; and
decoding the MBS SFN data communication based at least in part on a cyclic prefix type and a virtual cell identifier indicated by the configuration associated with the G-RNTI.

19. The method of claim 16, wherein the multicast traffic channel and a multicast control channel that is associated with the MBS SFN data communication are mapped to a downlink shared transport channel that is mapped to the PDSCH that is associated with both SFN communications and unicast communications.

20. The method of claim 16, wherein the configuration is included in a system information block (SIB), and wherein the SIB indicates at least one of:
an identifier associated with the MBS SFN area;
a quantity of symbols in a slot that are not associated with MBS SFN communications;
a multicast control channel (MCCH) resource and cycle configuration;
an MCCH change notification configuration; or
a modulation and coding scheme (MCS) that is to be applied to subframes associated with MCCH scheduling.

21. The method of claim 16, wherein the configuration is included in a radio resource control (RRC) configuration, and wherein the RRC configuration indicates at least one of:
identifiers of the one or more multicast traffic channels,
a resource allocation for each multicast traffic channel of the one or more multicast traffic channels,
a multicast channel scheduling period for each multicast traffic channel of the one or more multicast traffic channels, or
a discontinuous reception (DRX) cycle for each multicast traffic channel of the one or more multicast traffic channels.

22. The method of claim 16, further comprising receiving, from a base station, an edge cell notification indicating that a cell associated with the base station is located proximate to an edge of the MBS SFN area, and wherein receiving the MBS SFN data communication comprises:
receiving the MBS SFN data communication based at least in part on performing beamforming that is based at least in part on receiving the edge cell notification.

23. A method of wireless communication performed by a distributed unit (DU), comprising:
receiving, from a central unit (CU), a configuration for an inter-DU multicast broadcast service (MBS) single frequency network (SFN) area, the configuration indicating configuration information for one or more multicast channels;
transmitting, to one or more user equipments (UEs) in accordance with the configuration, a physical downlink control channel (PDCCH) communication scheduling an MBS SFN data communication that is associated with a multicast traffic channel; and transmitting, to the one or more UEs, the MBS SFN data communication via a physical downlink shared channel (PDSCH) that is associated with both SFN communications and unicast communications or a PDSCH that is associated with only MBS SFN communications.

24. The method of claim 23, wherein the configuration indicates one or more resources of the PDSCH that are reserved for SFN communications, and wherein at least one resource, of the one or more resources of the PDSCH that are reserved for SFN communications, is used by the DU for unicast transmissions based at least in part on no SFN communications being associated with the at least one resource.

25. The method of claim 23, wherein the configuration is included in an F1 application protocol message.

26. The method of claim 23, wherein the configuration indicates a resource partition for the PDSCH, and wherein the resource partition indicates sets of resources associated with different multicast channels.

27. The method of claim 23, further comprising transmitting, to the one or more UEs, a multicast control channel (MCCH) configuration, for the inter-DU MBS SFN area, indicating a resource allocation and a multicast channel scheduling period for one or more multicast traffic channels.

28. The method of claim 23, further comprising receiving, from the CU, synchronization timing information for MBS SFN transmissions, and
    wherein the MBS SFN data communication is transmitted using a timing that is based at least in part on the synchronization timing information.

29. The method of claim 23, further comprising receiving, from the CU, an edge cell notification indicating that a cell associated with the DU is located proximate to an edge of the inter-DU MBS SFN area, and wherein transmitting the MBS SFN data communication comprises:
    refraining from using one or more beams, associated with the cell, to transmit the MBS SFN data communication based at least in part on receiving the edge cell notification.

30. The method of claim 23, wherein the PDSCH is associated with an extended cyclic prefix (ECP), and wherein the PDCCH communication is associated with the ECP or a normal cyclic prefix (NCP).

* * * * *